United States Patent
Jang et al.

(10) Patent No.: US 11,438,630 B2
(45) Date of Patent: Sep. 6, 2022

(54) MOTION PREDICTION-BASED IMAGE CODING METHOD AND DEVICE

(71) Applicant: LG Electronics Inc., Seoul (KR)

(72) Inventors: Hyeongmoon Jang, Seoul (KR); Naeri Park, Seoul (KR); Seunghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/555,200

(22) Filed: Dec. 17, 2021

(65) Prior Publication Data

US 2022/0109887 A1    Apr. 7, 2022

Related U.S. Application Data

(63) Continuation of application No. PCT/KR2020/008000, filed on Jun. 19, 2020.
(Continued)

(51) Int. Cl.
*H04N 19/70* (2014.01)
*H04N 19/119* (2014.01)
(Continued)

(52) U.S. Cl.
CPC .......... *H04N 19/70* (2014.11); *H04N 19/119* (2014.11); *H04N 19/132* (2014.11);
(Continued)

(58) Field of Classification Search
CPC .... H04N 19/70; H04N 19/119; H04N 19/132; H04N 19/159; H04N 19/174; H04N 19/176; H04N 19/503
See application file for complete search history.

(56) References Cited

U.S. PATENT DOCUMENTS

2020/0314432 A1* 10/2020 Wang .................. H04N 19/147

FOREIGN PATENT DOCUMENTS

EP          3913918 A1    11/2021
KR    10-2018-0093950 A    8/2018
(Continued)

OTHER PUBLICATIONS

Chen, Yi-wen et al. CE4: Regular merge flag coding (CE4-1.2.a and CE4-1.2.b). JVET-N0324. Joint Video Experts Team (JVET) of ITU-TSG 16 WP 3 and ISO/IEC JTC 1/SC 29/WG 11. 14th Meeting: Geneva, CH. Mar. 21, 2019 Sec pp. 1-2.
(Continued)

*Primary Examiner* — Nam D Pham
(74) *Attorney, Agent, or Firm* — Dentons US LLP

(57) ABSTRACT

A decoding method carried out by a decoding device, according to the present document, comprises the steps of: acquiring, from a bitstream, information associated with a prediction mode of a current block; deriving a prediction mode of the current block on the basis of the information associated with the prediction mode; deriving prediction samples of the current block on the basis of the prediction mode; and generating reconstructed samples on the basis of the prediction samples, wherein the bitstream comprises a sequence parameter set, the sequence parameter set comprising a combined inter-picture merge and intra-picture prediction (CIIP) enable flag, and the step for deriving may comprise a step for parsing a regular merge flag from the bitstream on the basis of the satisfying of a condition based on the CIIP enable flag and a condition based on the size of the current block.

15 Claims, 17 Drawing Sheets

Related U.S. Application Data

(60) Provisional application No. 62/863,795, filed on Jun. 19, 2019.

(51) Int. Cl.
*H04N 19/132* (2014.01)
*H04N 19/503* (2014.01)
*H04N 19/176* (2014.01)
*H04N 19/174* (2014.01)
*H04N 19/159* (2014.01)

(52) U.S. Cl.
CPC ......... *H04N 19/159* (2014.11); *H04N 19/174* (2014.11); *H04N 19/176* (2014.11); *H04N 19/503* (2014.11)

(56) References Cited

FOREIGN PATENT DOCUMENTS

KR   10-2019-0029748 A   3/2019
KR   10-2019-0057433 A   5/2019

OTHER PUBLICATIONS

Xu, Weiwei et al. CE.10: Simplification on Combined Inter-Intra Prediction with Size Restriction (Test 10.1.5). JVET-M0293. Joint Video Experts Team (JVET) of ITU-T SG 16 WP 3 and ISO/IEC JTC 1/SC 29/WG 11. 13th Meeting: Marrakech, MA. Jan. 2, 2019. See pp. 1-2.

Jing Ye, et al., "Non-CE4: Redundancy removal for merge mode signalling", Joint Video Experts Team (JVET) of ITU-T SG 16 WP 3 and ISO/IEC JTC 1/SC 29/WG 11, 15th Meeting: Gothenburg, SE, Jul. 3-12, 2019. JVET-O0534.

Geonjung Ko, et al., "Non-CE4: Merge mode signalling overhead reduction", Joint Video Experts Team (JVET) of ITU-T SG 16 WP 3 and ISO/IEC JTC 1/SC 29/WG 11, 15th Meeting: Gothenburg, SE, Jul. 3-12, 2019. JVET-O0309.

Benjamin Bross, et al., "Versatile Video Coding (Draft 5)", Joint Video Experts Team (JVET)of ITU-T SG 16 WP 3 and ISO/IEC JTC 1/SC 29/WG 11, 14th Meeting: Geneva, CH, Mar. 19-27, 2019. JVET-N1001-v8.

\* cited by examiner

MOTION PREDICTION-BASED IMAGE CODING METHOD AND DEVICE

CROSS-REFERENCE TO RELATED APPLICATIONS

This application is a continuation of International Application No PCT/KR2020/008000, filed Jun. 19, 2020, which claims the benefit of U.S. Patent Application No. 62/863,795, filed Jun. 19, 2019, the contents of which are all hereby incorporated by reference herein in their entirety.

BACKGROUND OF THE DISCLOSURE

Field of the Disclosure

The present disclosure relates to a method and apparatus for coding an image based on motion prediction.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

The present disclosure provides a method and apparatus for increasing image coding efficiency.

The present disclosure also provides a method and apparatus for efficiently performing inter prediction.

The present disclosure also provides a method and apparatus for preventing unnecessary signaling during inter prediction.

In an aspect, a decoding method performed by a decoding apparatus includes: acquiring information on a prediction mode of a current block from a bitstream; deriving the prediction mode of the current block based on the information on the prediction mode; generating prediction samples of the current block based on the prediction mode; and generating reconstructed samples based on the prediction samples, wherein the bitstream includes a sequence parameter set, the sequence parameter set includes a combined inter-picture merge and intra-picture prediction (CIIP) enabled flag, and the deriving includes parsing a regular merge flag from the bitstream based on that a condition based on the CIIP enabled flag and a condition based on a size of the current block are satisfied.

In another aspect, an encoding method performed by an encoding apparatus includes: determining a prediction mode of a current block; generating information on the prediction mode based on the prediction mode; and encoding image information including the information on the prediction mode, wherein the image information includes a sequence parameter set, the sequence parameter includes a combined inter-picture merge and intra-picture prediction (CIIP) enabled flag, and the image information includes a regular merge flag based on that a condition based on the CIIP enabled flag and a condition based on a size of the current block are satisfied.

In another aspect, a computer-readable digital storage medium includes information causing a decoding apparatus to perform a decoding method, wherein the decoding method includes: acquiring information on a prediction mode of a current block from a bitstream; deriving the prediction mode of the current block based on the information on the prediction mode; generating prediction samples of the current block based on the prediction mode; and generating reconstructed samples based on the prediction samples, wherein the bitstream includes a sequence parameter set, the sequence parameter set includes a combined inter-picture merge and intra-picture prediction (CIIP) enabled flag, and the deriving includes parsing a regular merge flag from the bitstream based on that a condition based on the CIIP enabled flag and a condition based on a size of the current block are satisfied.

Advantageous Effects

According to an embodiment of the present disclosure, overall image/video compression efficiency may be improved.

According to an embodiment of the present disclosure, inter prediction may be efficiently performed.

According to an embodiment of the present disclosure, signaling of unnecessary syntax may be efficiently removed during inter prediction.

DESCRIPTION OF EXEMPLARY EMBODIMENTS

Figure 1:
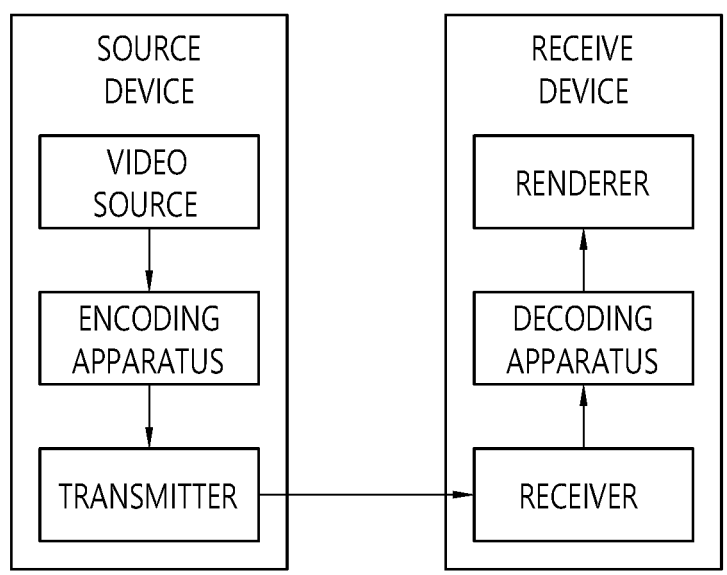
FIG. 1 schematically shows an example of a video/image coding system to which embodiments of the present disclosure may be applied.

The disclosure of the present disclosure may be modified in various forms, and specific embodiments thereof will be described and illustrated in the drawings. The terms used in the present disclosure are used to merely describe specific embodiments, but are not intended to limit the disclosed method in the present disclosure. An expression of a singular number includes an expression of 'at least one', so long as it is clearly read differently. The terms such as "include" and "have" are intended to indicate that features, numbers, steps, operations, elements, components, or combinations thereof used in the document exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented by mutually different hardware or different software. For example, two or more of the configurations may be combined to form one configuration, and one configuration may also be divided into multiple configurations. Without departing from the gist of the disclosed method of the present disclosure, embodiments in which configurations are combined and/or separated are included in the scope of the disclosure of the present disclosure.

Hereinafter, embodiments of the present disclosure will be described in detail with reference to the accompanying drawings. In addition, like reference numerals are used to indicate like elements throughout the drawings, and the same descriptions on the like elements may be omitted.

FIG. 1 illustrates an example of a video/image coding system to which the embodiments of the present disclosure may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in a versatile video coding (VVC) standard. In addition, the method/embodiment disclosed in this document may be applied to a method disclosed in an essential video coding (EVC) standard, AOMedia Video 1 (AV1) standard, 2nd generation of audio video coding standard (AVS2), or a next-generation video/image coding standard (e.g., H.267, H.268, etc.).

Various embodiments related to video/image coding are presented in this document, and the embodiments may be combined with each other unless otherwise stated.

In this document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In this document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of this document as well.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture). A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture). A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. In this document, tile group and slice may be used interchangeably. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.

"Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
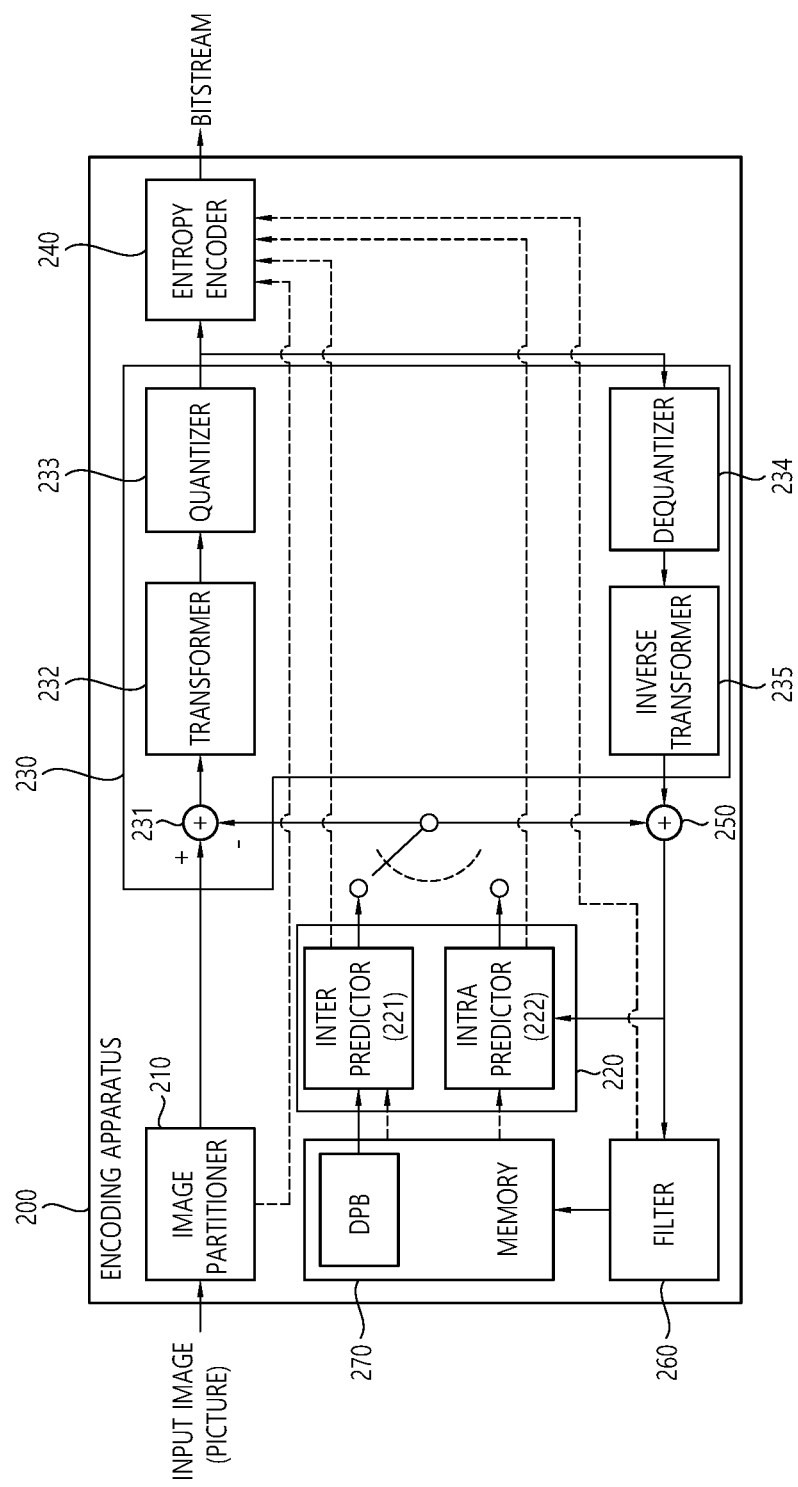
FIG. 2 is a diagram schematically illustrating a configuration of a video/image encoding apparatus to which embodiments of the present disclosure may be applied.

FIG. 2 is a diagram schematically illustrating the configuration of a video/image encoding apparatus to which the embodiments of the present disclosure may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor 220 may perform prediction on a processing target block (hereinafter, referred to as a current block) and generate a predicted block including prediction samples for the current block. The predictor 220 may determine whether intra prediction or inter prediction is applied in units of a current block or CU. The predictor 220 may generate various information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor 220 may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in this document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal.

The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form.

The entropy encoder 240 may perform various encoding methods such as, for example, exponential Golomb, context-adaptive variable length coding (CAVLC), and context-adaptive binary arithmetic coding (CABAC). The entropy encoder 240 may encode information necessary for video/ image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In this document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
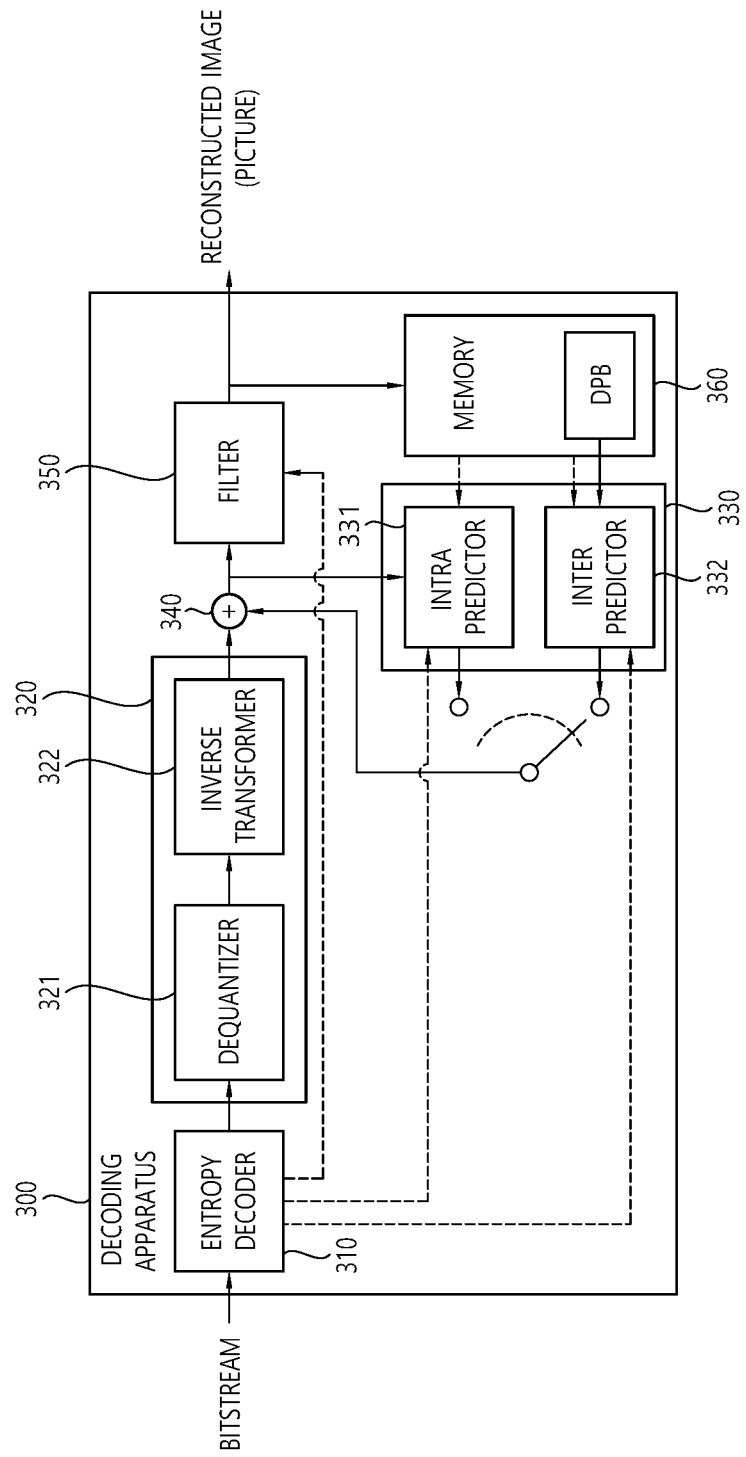
FIG. 3 is a diagram schematically illustrating a configuration of a video/image decoding apparatus to which embodiments of the present disclosure may be applied.

FIG. 3 is a diagram for schematically explaining the configuration of a video/image decoding apparatus to which the embodiments of the present disclosure may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (inter predictor 332 and intra predictor 331), and residual values on which the entropy decoding has been performed in the entropy decoder 310, that is, the quantized transform coefficients and related parameter information, may be input to the residual processor 320.

The residual processor 320 may derive a residual signal (residual block, residual samples, residual sample array). Also, information on filtering among the information decoded by the entropy decoder 310 may be provided to the filter 350. Meanwhile, a receiving unit (not shown) for receiving a signal output from the encoding apparatus may be further configured as an internal/external element of the decoding apparatus 300, or the receiving unit may be a component of the entropy decoder 310. Meanwhile, the decoding apparatus according to this document may be called a video/image/picture decoding apparatus, and the decoding apparatus may be divided into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, an inter predictor 332, and an intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information on prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in this document. The palette mode may be considered as an example of intra coding or intra prediction. When the palette mode is applied, information on the palette table and the palette index may be included in the video/image information and signaled.

The intra predictor 331 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In this disclosure, the embodiments described in the filter 260, the inter predictor 221, and the intra predictor 222 of the encoding apparatus 200 may be applied equally or to correspond to the filter 350, the inter predictor 332, and the intra predictor 331.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bitstream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

When inter prediction is applied to a current block, the predictor of the encoding apparatus/decoding apparatus may perform the inter prediction in units of blocks and derive the prediction sample. Inter prediction may be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector on a reference picture which a reference picture index indicates. At this time, in order to reduce the amount of motion information transmitted in the inter prediction mode, the motion information of the current block may be predicted in units of blocks, subblocks, or samples, based on correlation of motion information between the neighboring block and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block existing in the current picture and a temporal neighboring block existing in the reference picture. The reference picture including the reference block, and the reference picture including the temporal neighboring block may be the same to each other or different from each other. The temporal neighboring block may be called a collocated reference block, a collocated CU (colCU), and the like, and the reference picture including the temporal neighboring block may be called a collocated picture (colPic). For example, motion information candidate list may be configured based on neighboring blocks of the current block, and a flag or index information indicating which candidate is selected (used) in order to derive a motion vector and/or a reference picture index of the current block may be signaled. Inter prediction may be performed based on various prediction modes. For example, in the case of a skip mode and a (normal) merge mode, motion information of the current block may be the same as motion information of the selected neighboring block. In the skip mode, unlike the merge mode, the residual signal may not be transmitted. In the case of motion information prediction (motion vector prediction (MVP)) mode, a motion vector of the selected neighboring block may be used as a motion vector predictor, and a motion vector difference may be signaled. In this case, a motion vector of the current block may be derived using the sum of the motion vector predictor and motion vector difference.

A video/image encoding procedure based on inter prediction may schematically include, for example, the following.

Figure 4:
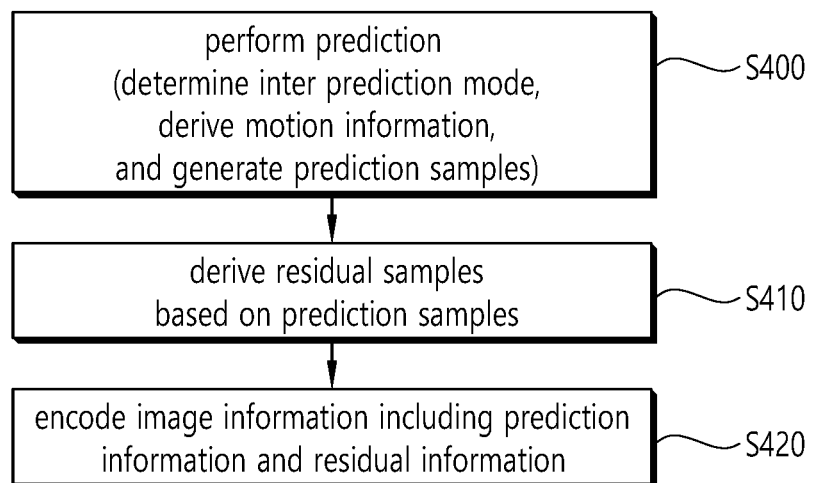
FIG. 4 shows an example of an inter prediction-based video/image encoding method.

FIG. 4 shows an example of an inter prediction-based video/image encoding method.

The encoding apparatus performs inter prediction on the current block (S400). The encoding apparatus may derive an inter prediction mode and motion information of the current block, and generate prediction samples of the current block. Here, the procedures of determining the inter prediction mode, deriving motion information, and generating prediction samples may be performed simultaneously, or one procedure may be performed before another procedure. For example, the inter predictor of the encoding apparatus may include a prediction mode determiner, a motion information deriver, and a prediction sample deriver, the prediction mode determiner may determine the prediction mode for the current block, and the motion information deriver may derive motion information of the current block, and the prediction sample deriver may derive prediction samples of the current block. For example, the inter predictor of the encoding apparatus searches for a block similar to the current block within a predetermined region (search region) of reference pictures through motion estimation and derive a reference block in which a difference from the current block is a minimum or a predetermined reference or less. Based on this, a reference picture index indicating a reference picture in which the reference block is located may be derived, and a motion vector may be derived based on a position difference between the reference block and the current block. The encoding apparatus may determine a mode applied to the current block from among various prediction modes. The encoding apparatus may compare rate-distortion (RD) costs for the various prediction modes and determine an optimal prediction mode for the current block.

For example, when a skip mode or a merge mode is applied to the current block, the encoding apparatus may construct a merge candidate list to be described later and derive a reference block in which a difference from the current block is minimal or a predetermined reference or less, among reference blocks indicated by merge candidates included in the merge candidate list. In this case, a merge candidate associated with the derived reference block may be selected, and merge index information indicating the selected merge candidate may be generated and signaled to the decoding apparatus. The motion information of the current block may be derived using the motion information of the selected merge candidate.

As another example, when the (A)MVP mode is applied to the current block, the encoding apparatus constructs an (A)MVP candidate list to be described later, and use a motion vector of a selected mvp candidate, among motion vector predictor (mvp) candidates included in the (A)MVP candidate list, as an mvp of the current block. In this case, for example, a motion vector indicating a reference block derived by the motion estimation described above may be used as the motion vector of the current block, and an mvp candidate having a motion vector having the smallest difference from the motion vector of the current block, among the mvp candidates, may be the selected mvp candidate. A motion vector difference (MVD) that is a difference obtained by subtracting the mvp from the motion vector of the current block may be derived. In this case, information on the MVD may be signaled to the decoding apparatus. In addition, when the (A)MVP mode is applied, the value of the reference picture index may be configured as reference picture index information and separately signaled to the decoding apparatus.

The encoding apparatus may derive residual samples based on the prediction samples (S410). The encoding apparatus may derive the residual samples by comparing the original samples of the current block with the prediction samples.

The encoding apparatus encodes image information including prediction information and residual information (S420). The encoding apparatus may output encoded image information in the form of a bitstream. The prediction information may include information on prediction mode information (e.g., skip flag, merge flag or mode index, etc.) and motion information as information related to the prediction procedure. The information on the motion information may include candidate selection information (e.g., merge index, mvp flag, or mvp index) that is information for deriving a motion vector. In addition, the information on the motion information may include the MVD information described above and/or reference picture index information. Also, the information on the motion information may include information indicating whether L0 prediction, L1 prediction, or pair (bi) prediction is applied. The residual information is information on the residual samples. The residual information may include information on quantized transform coefficients for the residual samples.

The output bitstream may be stored in a (digital) storage medium and transmitted to the decoding apparatus or may be transmitted to the decoding apparatus through a network.

Meanwhile, as described above, the encoding apparatus may generate a reconstructed picture (including reconstructed samples and reconstructed blocks) based on the reference samples and the residual samples. This is because the encoding apparatus may derive the same prediction result as that performed by the decoding apparatus, and through this, coding efficiency may be increased. Accordingly, the encoding apparatus may store the reconstructed picture (or reconstructed samples, reconstructed block) in a memory and use the reconstructed picture as a reference picture for inter prediction. As described above, an in-loop filtering procedure may be further applied to the reconstructed picture.

A video/image decoding procedure based on inter prediction may schematically include, for example, the following.

Figure 5:
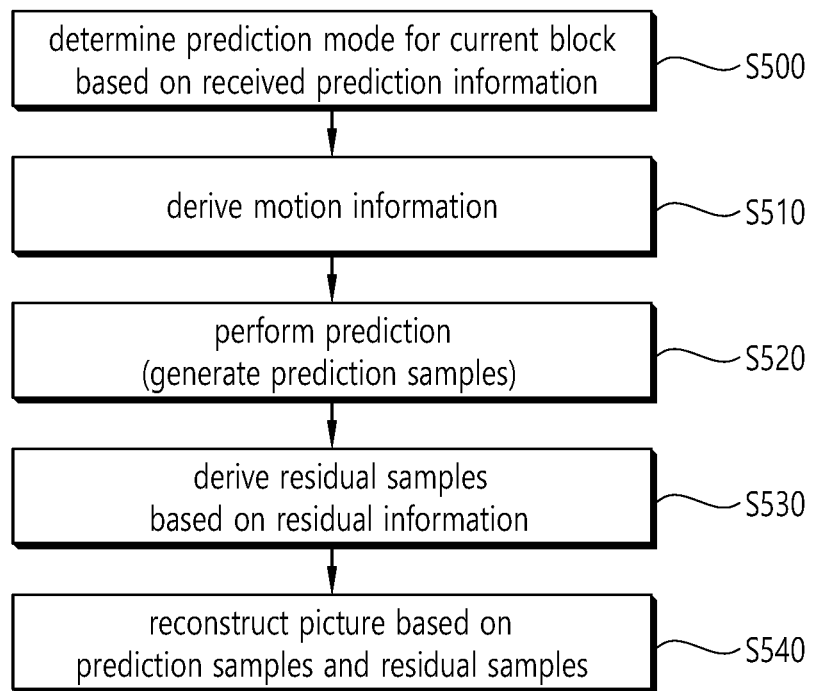
FIG. 5 shows an example of a video/image decoding method based on inter prediction.

FIG. 5 shows an example of a video/image decoding method based on inter prediction.

Referring to FIG. 5, the decoding apparatus may perform an operation corresponding to the operation performed by the encoding apparatus. The decoding apparatus may perform prediction on the current block based on the received prediction information and derive prediction samples.

Specifically, the decoding apparatus may determine a prediction mode for the current block based on the received prediction information (S500). The decoding apparatus may determine which inter prediction mode is to be applied to the current block based on prediction mode information in the prediction information.

For example, based on the merge flag, it may be determined whether the merge mode is applied to the current block or whether the (A)MVP mode is determined. Alternatively, one of various inter prediction mode candidates may be selected based on the mode index. The inter prediction mode candidates may include skip mode, merge mode, and/or (A)MVP mode, or may include various inter prediction modes to be described later.

The decoding apparatus derives motion information of the current block based on the determined inter prediction mode (S510). For example, when the skip mode or the merge mode is applied to the current block, the decoding apparatus may construct a merge candidate list to be described later and select one merge candidate from among the merge candidates included in the merge candidate list. The selection may be performed based on the selection information (merge index) described above. The motion information of the current block may be derived using the motion information of the selected merge candidate. The motion information of the selected merge candidate may be used as the motion information of the current block.

As another example, when the (A)MVP mode is applied to the current block, the decoding apparatus may construct an (A)MVP candidate list to be described later and use a motion vector of a selected mvp candidate, among motion vector predictor (mvp) candidates included in the (A)MVP candidate list, as the mvp of the current block. The selection may be performed based on the selection information (mvp flag or mvp index) described above. In this case, the MVD of the current block may be derived based on the information on the MVD, and a motion vector of the current block may be derived based on the mvp of the current block and the MVD. Also, the reference picture index of the current block may be derived based on the reference picture index information. A picture indicated by the reference picture index in the reference picture list for the current block may be derived as a reference picture referenced for inter prediction of the current block.

Meanwhile, as will be described later, the motion information of the current block may be derived without configuring a candidate list. In this case, the motion information of the current block may be derived according to a procedure disclosed in a prediction mode to be described later. In this case, the configuration of the candidate list as described above may be omitted.

The decoding apparatus may generate prediction samples for the current block based on the motion information of the current block (S520). In this case, the reference picture may be derived based on the reference picture index of the current block, and prediction samples of the current block may be derived using samples of the reference block indicated by the motion vector of the current block on the reference picture. In this case, as described later, a prediction sample filtering procedure may be further performed on all or some of the prediction samples of the current block in some cases.

For example, the inter predictor of the decoding apparatus may include a prediction mode determiner, a motion information deriver, and a prediction sample deriver. The prediction mode determiner may determine a prediction mode for the current block based on the received prediction mode information, the motion information deriver may derive motion information (motion vector and/or reference picture index, etc.) of the current block based on the information on the received motion information received, and the prediction sample deriver may derive prediction samples of the current block.

The decoding apparatus generates residual samples for the current block based on the received residual information (S530). The decoding apparatus may generate reconstructed samples for the current block based on the prediction samples and the residual samples, and generate a reconstructed picture based thereon (S540). Thereafter, as described above, an in-loop filtering procedure may be further applied to the reconstructed picture.

Figure 6:
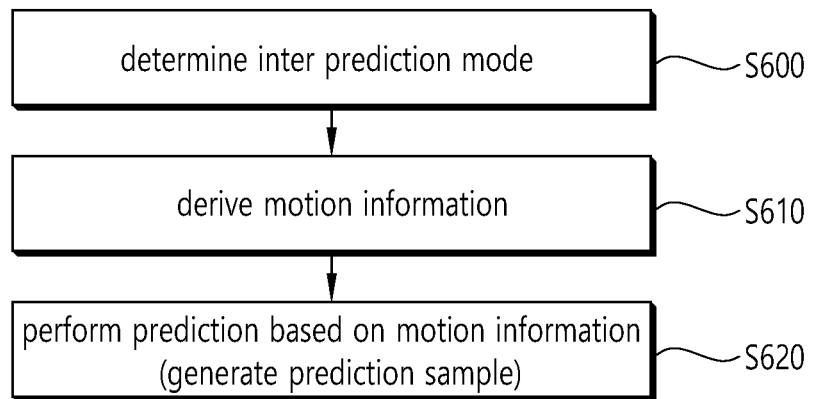
FIG. 6 exemplarily shows an inter prediction procedure.

FIG. 6 exemplarily shows an inter prediction procedure.

Referring to FIG. 6, as described above, the inter prediction procedure may include determining an inter prediction mode, deriving motion information according to the determined prediction mode, and performing prediction based on the derived motion information (generation of a prediction sample). The inter prediction procedure may be performed by the encoding apparatus and the decoding apparatus as described above. In this document, a coding apparatus may include the encoding apparatus and/or the decoding apparatus.

Referring to FIG. 6, the coding apparatus determines an inter prediction mode for the current block (S600). Various inter prediction modes may be used for prediction of a current block within a picture. For example, various modes such as merge mode, skip mode, motion vector prediction (MVP) mode, affine mode, subblock merge mode, merge with MVD (MMVD) mode, historical motion vector prediction (HMVP) mode, etc. DMVR (decoder side motion vector refinement) mode, AMVR (adaptive motion vector resolution) mode, BCW (Bi-prediction with CU-level weight), BDOF (Bi-directional optical flow), etc. may be used as ancillary modes in addition or instead. The affine mode may be referred to as an affine motion prediction mode. The MVP mode may be referred to as an advanced motion vector prediction (AMVP) mode. In this document, some modes and/or motion information candidates derived by some modes may be included as one of motion information-related candidates of other modes. For example, the HMVP candidate may be added as a merge candidate of the merge/skip mode or may be added as an mvp candidate of the MVP mode.

The prediction mode information indicating the inter prediction mode of the current block may be signaled from the encoding apparatus to the decoding apparatus. The prediction mode information may be included in a bitstream and received at the decoding apparatus. The prediction mode information may include index information indicating one of multiple candidate modes. Further, the inter prediction mode may be indicated through hierarchical signaling of flag information. In this case, the prediction mode information may include one or more flags. For example, it may be indicated whether the skip mode is applied by signaling the skip flag; it may be indicated whether the merge mode is applied by signaling the merge flag for the skip mode not being applied; and it may be indicated that the MVP mode is applied or a flag for further partition may be further signaled when the merge mode is not applied. The affine mode may be signaled as an independent mode, or may be signaled as a mode dependent on the merge mode, the MVP mode or the like. For example, the affine mode may include an affine merge mode and an affine MVP mode.

Meanwhile, information indicating whether or not the above-described list0 (L0) prediction, list1 (L1) prediction, or bi-prediction is used in the current block (current coding unit) may be signaled to the current block. Said information may be referred to as motion prediction direction information, inter prediction direction information, or inter prediction indication information, and may be constructed/encoded/signaled in the form of, for example, an inter_pred_idc syntax element. That is, the inter_pred_idc syntax element may indicate whether or not the above-described list0 (L0) prediction, list1(L1) prediction, or bi-prediction is used for the current block (current coding unit). In this document, for convenience of description, the inter prediction type (L0 prediction, L1 prediction, or BI prediction) indicated by the inter_pred_idc syntax element may be represented as a motion prediction direction. L0 prediction may be represented by pred_L0; L1 prediction may be represented by pred_L1; and bi-prediction may be represented by pred_BI. For example, the following prediction type may be indicated according to the value of the inter_pred_idc syntax element.

As described above, one picture may include one or more slices. A slice may have one of the slice types including intra (I) slice, predictive (P) slice, and bi-predictive (B) slice. The slice type may be indicated based on slice type information. For blocks in I slice, inter prediction is not used for prediction, and only intra prediction may be used. Of course, even in this case, the original sample value may be coded and signaled without prediction. For blocks in P slice, intra prediction or inter prediction may be used, and when inter prediction is used, only uni prediction may be used. Meanwhile, intra prediction or inter prediction may be used for blocks in B slice, and when inter prediction is used, up to the maximum bi-prediction may be used.

L0 and L1 may include reference pictures encoded/decoded before the current picture. For example, L0 may include reference pictures before and/or after the current picture in POC order, and L1 may include reference pictures after and/or before the current picture in POC order. In this case, a reference picture index lower relative to reference pictures earlier than the current picture in POC order may be allocated to L0, and a reference picture index lower relative to reference pictures later than the current picture in POC order may be allocated to L1. In the case of B slice, bi-prediction may be applied, and in this case, unidirectional bi-prediction may be applied, or bi-directional bi-prediction may be applied. Bi-directional bi-prediction may be referred to as true bi-prediction.

Specifically, for example, information on the inter prediction mode of the current block may be coded and signaled at a CU (CU syntax) level or the like, or may be implicitly determined according to a condition. In this case, some modes may be explicitly signaled, and other modes may be implicitly derived.

For example, the CU syntax may carry information on the (inter) prediction mode, etc. as shown in Table 1 below.

TABLE 1

| | Descriptor |
|---|---|
| coding_unit( x0, y0, cbWidth, cbHeight, treeType ) { | |
|   if( slice_type != I \| \| sps_ibc_enabled_flag ) { | |
|     if( treeType != DUAL_TREE_CHROMA && | |
|       !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|       && !( cbWidth = = 4 && cbHeight = = 4 ) ) | |
|       pred_mode_flag | ae(v) |
|     if( ( ( slice_type = = I && cu_skip_flag[ x0 ][ y0 ] = =0 ) \| \| | |
|       ( slice_type != I && ( CuPredMode[ x0 ][ y0 ] != MODE_INTRA \| \| | |
|       ( cbWidth = = 4 && cbHeight = = 4 && cu_skip_flag[ x0 ][ y0 ] = = 0 ) ) ) ) && | |
|       sps_ibc_enabled_flag && ( cbWidth != 128 \| \| cbHeight != 128 ) ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | |
|       pcm_sample( cbWidth, cbHeight, treeType) | |
|     } else { | |
|       if( treeType = = SINGLE_TREE \| \| treeType = = DUAL_TREE_LUMA ) { | |
|         if( cbWidth <= 32 && cbHeight <= 32 ) | |
|           intra_bdpcm_flag[ x0 ][ y0 ] | ae(v) |
|         if( intra_bdpcm_flag[ x0 ][ y0 ] ) | |
|           intra_bdpcm_dir_flag[ x0 ][ y0 ] | ae(v) |
|         else { | |
|           if( sps_mip_enabled_flag && | |
|             ( Abs( Log2( cbWidth ) − Log2( cbHeight ) ) <= 2 ) && | |
|             cbWidth <= MaxTbSizeY && cbHeight <= MaxTbSizeY ) | |
|             intra_mip_flag[ x0 ][ y0 ] | ae(v) |
|           if( intra_mip_flag[ x0 ][ y0 ] ) { | |
|             intra_mip_mpm_flag[ x0 ] [ y0 ] | ae(v) |
|             if( intra_mip_mpm_flag[ x0 ][ y0 ] ) | |
|               intra_mip_mpm_idx[ x0 ][ y0 ] | ae(v) |
|             else | |
|               intra_mip_mpm_remainder[ x0 ][ y0 ] | ae(v) |
|           } else { | |
|             if( sps_mrl_enabled_flag && ( ( y0 % CtbSizeY ) > 0 ) ) | |
|               intra_luma_ref_idx[ x0 ][ y0 ] | ae(v) |
|             if ( sps_isp_enabled_flag && intra_luma_ref_idx[ x0 ][ y0 ] = = 0 && | |
|               ( cbWidth <= MaxTbSizeY && cbHeight <= MaxTbSizeY ) && | |
|               ( cbWidth * cbHeight > MinTbSizeY * MinTbSizeY ) ) | |
|               intra_subpartitions_mode_flag[ x0 ][ y0 ] | ae(v) |
|             if( intra_subpartitions_mode_flag[ x0 ][ y0 ] = = 1 && | |
|               cbWidth <= MaxTbSizeY && cbHeight <= MaxTbSizeY ) | |
|               intra_subpartitions_split_flag[ x0 ][ y0 ] | aetv) |
|             if( intra_luma_ref_idx[ x0 ][ y0 ] = = 0 && | |
|               intra_subpartitions_mode_flag[ x0 ][ y0 ] = = 0 ) | |
|               intra_luma_mpm_flag[ x0 ][ y0 ] | ae(v) |
|             if( intra_luma_mpm_flag[ x0 ][ y0 ] ) { | |
|               if( intra_luma_ref_idx[ x0 ][ y0 ] = = 0 ) | |
|                 intra_luma_not_planar_flag[ x0 ][ y0 ] | ae(v) |

TABLE 1-continued

|  | Descriptor |
|---|---|
| ``if( intra_luma_not_planar_flag[ x0 ][ y0 ] )`` | |
| ``        intra_luma_mpm_idx[ x0 ][ y0 ]`` | ae(v) |
| ``    } else`` | |
| ``        intra_luma_mpm_remainder[ x0 ][ y0 ]`` | ae(v) |
| ``    }`` | |
| ``}`` | |
| ``if( treeType = = SINGLE_TREE | | treeType = = DUAL_TREE_CHROMA )`` | |
| ``    intra_chroma_pred_mode[ x0 ][ y0 ]`` | ae(v) |
| ``}`` | |
| ``} else if( treeType != DUAL_TREE_CHROMA ) { /* MODE_INTER or MODE_IBC */`` | |
| ``    if( cu_skip_flag[ x0 ][ y0 ] = = 0 )`` | |
| ``        general_merge_flag[ x0 ][ y0 ]`` | ae(v) |
| ``    if( general_merge_flag[ x0 ][ y0 ] ) {`` | |
| ``        merge_data( x0, y0, cbWidth, cbHeight )`` | |
| ``    } else if ( CuPredMode[ x0 ][ y0 ] = = MODE_IBC ) {`` | |
| ``        mvd_coding( x0, y0, 0, 0 )`` | |
| ``        mvp_l0_flag[ x0 ][ y0 ]`` | ae(v) |
| ``        if( sps_amvr_enabled_flag &&`` | |
| ``            ( MvdL0[ x0 ][ y0 ][ 0 ] != 0 | | ( MvdL0[ x0 ][ y0 ][ 1 ] != 0 ) ) {`` | |
| ``            amvr_precision_flag[ x0 ][ y0 ]`` | ae(v) |
| ``        }`` | |
| ``    } else {`` | |
| ``        if( slice_type = = B )`` | |
| ``            inter_pred_idc[ x0 ][ y0 ]`` | ae(v) |
| ``        if( sps_affine_enabled_flag && cbWidth >= 16 && cbHeight >= 16 ) {`` | |
| ``            inter_affine_flag[ x0 ][ y0 ]`` | ae(v) |
| ``            if( sps_affine_type_flag && inter_affine_flag[ x0 ][ y0 ] )`` | |
| ``                cu_affine_type_flag[ x0 ][ y0 ]`` | ae(v) |
| ``        }`` | |
| ``        if( sps_smvd_enabled_flag && inter_pred_idc[ x0 ][ y0 ] = = PRED_BI &&`` | |
| ``            !inter_affine_flag[ x0 ][ y0 ] && RefIdxSymL0 > -1 && RefIdxSymL1 > -1 )`` | |
| ``            sym_mvd_flag[ x0 ][ y0 ]`` | ae(v) |
| ``        if( inter_pred_idc[ x0 ][ y0 ] != PRED_L1 ) {`` | |
| ``            if( NumRefIdxActive[ 0 ] > 1 && !sym_mvd_flag[ x0 ][ y0 ] )`` | |
| ``                ref_idx_l0[ x0 ][ y0 ]`` | ae(v) |
| ``            mvd_coding( x0, y0, 0, 0 )`` | |
| ``            if( MotionModelIdc[ x0 ][ y0 ] > 0 )`` | |
| ``                mvd_coding( x0, y0, 0, 1 )`` | |
| ``            if(MotionModelIdc[ x0 ][ y0 ] > 1 )`` | |
| ``                mvd_coding( x0, y0, 0, 2 )`` | |
| ``            mvp_l0_flag[ x0 ][ y0 ]`` | ae(v) |
| ``        } else {`` | |
| ``            MvdL0[ x0 ][ y0 ][ 0 ] = 0`` | |
| ``            MvdL0[ x0 ][ y0 ][ 1 ] = 0`` | |
| ``        }`` | |
| ``        if( inter_pred_idc[ x0 ][ y0 ] != PRED_L0 ) {`` | |
| ``            if( NumRefIdxActive[ 1 ] > 1 && !sym_mvd_flag[ x0 ][ y0 ] )`` | |
| ``                ref_idx_l1[ x0 ][ y0 ]`` | ae(v) |
| ``            if( mvd_l1_zero_flag && inter_pred_idc[ x0 ][ y0 ] = = PRED_BI ) {`` | |
| ``                MvdL1[ x0 ][ y0 ][ 0 ] = 0`` | |
| ``                MvdL1[ x0 ][ y0 ][ 1 ] = 0`` | |
| ``                MvdCpL1[ x0 ][ y0 ][ 0 ][ 0 ] = 0`` | |
| ``                MvdCpL1[ x0 ][ y0 ][ 0 ][ 1 ] = 0`` | |
| ``                MvdCpL1[ x0 ][ y0 ][ 1 ][ 0 ] = 0`` | |
| ``                MvdCpL1[ x0 ][ y0 ][ 1 ][ 1 ] = 0`` | |
| ``                MvdCpL1[ x0 ][ y0 ][ 2 ][ 0 ] = 0`` | |
| ``                MvdCpL1[ x0 ][ y0 ][ 2 ][ 1 ] = 0`` | |
| ``            } else {`` | |
| ``                if( sym_mvd_flag[ x0 ][ y0 ] ) {`` | |
| ``                    MvdL1[ x0 ][ y0 ][ 0 ] = −MvdL0[ x0 ][ y0 ][ 0 ]`` | |
| ``                    MvdL1[ x0 ][ y0 ][ 1 ] = −MvdL0[ x0 ][ y0 ][ 1 ]`` | |
| ``                } else`` | |
| ``                    mvd_coding( x0, y0, 1, 0 )`` | |
| ``                if( MotionModelIdc[ x0 ][ y0 ] > 0 )`` | |
| ``                    mvd_coding( x0, y0, 1, 1 )`` | |
| ``                if(MotionModelIdc[ x0 ][ y0 ] > 1 )`` | |
| ``                    mvd_coding( x0, y0, 1, 2 )`` | |
| ``                mvp_l1_flag[ x0 ][ y0 ]`` | ae(v) |
| ``            }`` | |
| ``            MvdCpL1[ x0 ][ y0 ][ 0 ][ 0 ] = 0`` | |
| ``            MvdCpL1[ x0 ][ y0 ][ 0 ][ 1 ] = 0`` | |
| ``            MvdCpL1[ x0 ][ y0 ][ 1 ][ 0 ] = 0`` | |
| ``            MvdCpL1[ x0 ][ y0 ][ 1 ][ 1 ] = 0`` | |

TABLE 1-continued

| | Descriptor |
|---|---|
| ``` | |
|                         MvdCpL1[ x0 ][ y0 ][ 2 ][ 0 ] = 0 | |
|                         MvdCpL1[ x0 ][ y0 ][ 2 ][ 1 ] = 0 | |
|                 } else { | |
|                         if( sym_mvd_flag[ x0 ][ y0 ] ) { | |
|                                 MvdL1[ x0 ][ y0 ][ 0 ] = −MvdL0[ x0 ][ y0 ][ 0 ] | |
|                                 MvdL1[ x0 ][ y0 ][ 1 ] = −MvdL0[ x0 ][ y0 ][ 1 ] | |
|                         } else | |
|                                 mvd_coding( x0, y0, 1, 0 ) | |
|                         if( MotionModelIdc[ x0 ][ y0 ] > 0 ) | |
|                                 mvd_coding( x0, y0, 1, 1 ) | |
|                         if(MotionModelIdc[ x0 ][ y0 ] > 1 ) | |
|                                 mvd_coding( x0, y0, 1, 2 ) | |
|                         mvp_l1_flag[ x0 ][ y0 ] | ae(v) |
|                 } | |
|                 if( amvr_flag[ x0 ][ y0 ] ) | |
|                         amvr_precision_flag[ x0 ][ y0 ] | ae(v) |
|         } | |
|                 if( sps_bcw_enabled_flag && inter_pred_idc[ x0 ][ y0 ] = = PRED_BI && | |
|                         luma_weight_l0_flag[ ref_idx_l0 [ x0 ][ y0 ] ] = = 0 && | |
|                         luma_weight_l1_flag[ ref_idx_l1 [ x0 ][ y0 ] ] = = 0 && | |
|                         chroma_weight_l0_flag[ ref_idx_l0 [ x0 ][ y0 ] ] = = 0 && | |
|                         chroma_weight_l1_flag[ ref_idx_l1 [ x0 ][ y0 ] ] = = 0 && | |
|                         cbWidth * cbHeight >= 256 ) | |
|                 bcw_idx[ x0 ][ y0 ] | ae(v) |
|         } | |
| } | |
| if( !pcm_flag[ x0 ][ y0 ] ) { | |
|         if( CuPredMode[ x0 ][ y0 ] != MODE_INTRA && | |
|                 general_merge_flag[ x0 ][ y0 ] = = 0 ) | |
|                 cu_cbf | ae(v) |
|         if( cu_cbf ) { | |
|                 if( CuPredMode[ x0 ][ y0 ] = = MODE_INTER && sps_sbt_enabled_flag && | |
|                         !ciip_flag[ x0 ][ y0 ] && !MergeTriangleFlag[ x0 ][ y0 ] ) { | |
|                         if( cbWidth <= MaxSbtSize && cbHeight <= MaxSbtSize ) { | |
|                                 allowSbtVerH = cbWidth >= 8 | |
|                                 allowSbtVerQ = cbWidth >= 16 | |
|                                 allowSbtHorH = cbHeight >= 8 | |
|                                 allowSbtHorQ = cbHeight >= 16 | |
|                                 if( allowSbVerH | | allowSbtHorH | | allowSbtVerQ | | allowSbtHorQ ) | |
|                                         cu_sbt_flag | ae(v) |
|                         } | |
|                         if( cu_sbt_flag ) { | |
|                                 if( ( allowSbtVerH | | allowSbtHorH ) && ( allowSbtVerQ | | allowSbtHorQ) ) | |
|                                         cu_sbt_quad_flag | ae(v) |
|                                 if( ( cu_sbt_quad_flag && allowSbtVerQ && allowSbtHorQ ) | | | |
|                                         ( !cu_sbt_quad_flag && allowSbtVerH && allowSbtHorH ) ) | |
|                                         cu_sbt_horizontal_flag | ae(v) |
|                                 cu_sbt_pos_flag | ae(v) |
|                         } | |
|                 } | |
|                 numSigCoeff = 0 | |
|                 numZeroOutSigCoeff = 0 | |
|                 transform_tree( x0, y0, cbWidth, cbHeight, treeType ) | |
|                 lfnstWidth = ( treeType = = DUAL_TREE_CHROMA ) ? cbWidth / SubWidthC | |
|                                                 : cbWidth | |
|                 lfnstHeight = ( treeType = = DUAL_TREE_CHROMA ) ? cbHeight / SubHeightC | |
|                                                 : cbHeight | |
|                 if( Min( lfnstWidth, lfnstHeight ) >= 4 && sps_lfnst_enabled_flag = = 1 && | |
|                         CuPredMode[ x0 ][ y0 ] = = MODE_INTRA && | |
|                         IntraSubPartitionsSplitType = = ISP_NO_SPLIT && | |
|                         !intra_mip_flag[ x0 ][ y0 ] ) { | |
|                         if( ( numSigCoeff > ( ( treeType = = SINGLE_TREE ) ? 2 : 1 ) ) && | |
|                                 numZeroOutSigCoeff = = 0 ) | |
|                                 lfnst_idx[ x0 ][ y0 ] | ae(v) |
|                 } | |
|         } | |
|     } | |
| } | |

Here, cu_skip_flag may indicate whether the skip mode is applied to the current block (CU).

pred_mode_flag equal to 0 specifies that the current coding unit is coded in inter prediction mode. Pred_mode_flag equal to 1 specifies that the current coding unit is coded in intra prediction mode.

pred_mode_ibc_flag equal to 1 specifies that the current coding unit is coded in IBC prediction mode. Pred_mode_jbc_flag equal to 0 specifies that the current coding unit is not coded in IBC prediction mode.

pcm_flag[x0][y0] equal to 1 specifies that the pcm_sample( ) syntax structure is present and the transform_tree( )) syntax structure is not present in the coding unit including the luma coding block at the location (x0, y0). Pcm_flag[x0][y0] equal to 0 specifies that pcm_sample( ) syntax structure is not present. That is, pcm_flag may represent whether a pulse coding modulation (PCM) mode is applied to the current block. If PCM mode is applied to the current block, prediction, transformation, quantization, etc. Are not applied, and values of the original sample in the current block may be coded and signaled.

intra_mip_flag[x0][y0] equal to 1 specifies that the intra prediction type for luma samples is matrix-based intra prediction (MIP). Intra_mip_flag[x0][y0] equal to 0 specifies that the intra prediction type for luma samples is not matrix-based intra prediction. That is, intra_mip_flag may represent whether an MIP prediction mode (type) is applied to (a luma sample of) the current block.

intra_chroma_pred_mode[x0][y0] specifies the intra prediction mode for chroma samples in the current block.

general_merge_flag[x0][y0] specifies whether the inter prediction parameters for the current coding unit are inferred from a neighbouring inter-predicted partition. That is, general_merge_flag may represent that general merge is available, and when the value of general_merge_flag is 1, regular merge mode, mmvd mode, and merge subblock mode (subblock merge mode) may be available. For example, when the value of general_merge_flag is 1, merge data syntax may be parsed from encoded video/image information (or bitstream), and the merge data syntax configured/coded to include information as shown in Table 2 below.

TABLE 2

|  | Descriptor |
|---|---|
| merge_data( x0, y0, cbWidth, cbHeight ) { | |
|   if ( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag \|\| cbWidth * cbHeight != 32 ) | |
|       regular_merge_flag[ x0 ][ y0 ] | ae(v) |
|     if ( regular_merge_flag[ x0 ][ y0 ] = = 1 ){ | |
|       if( MaxNumMergeCand > 1 ) | |
|         merge_Idx[ x0 ][ y0 ] | ae(v) |
|     } else { | |
|       if( sps_mmvd_enabled_flag && cbWidth * cbHeight != 32 ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] = = 0 && | |
|             ( cbWidth * cbHeight ) >= 64 && cbWidth < 128 && cbHeight < 128 ) | |
|           { | |
|             ciip_flag[ x0 ][ y0 ] | ae(v) |
|           if( ciip_flag[ x0 ][ y0 ] && MaxNumMergeCand > 1 ) | |
|             merge_idx[ x0 ][ y0 ] | ae(v) |
|           } | |
|           if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | |

Here, regular_merge_flag[x0][y0] equal to 1 specifies that regular merge mode is used to generate the inter prediction parameters of the current coding unit. That is, regular_merge_flag represents whether the merge mode (regular merge mode) is applied to the current block.

mmvd_merge_flag[x0][y0] equal to 1 specifies that merge mode with motion vector difference is used to generate the inter prediction parameters of the current coding unit. That is, mmvd_merge_flag represents whether MMVD is applied to the current block.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0].

mmvd_distance_idx[x0][y0] specifies the index used to derive MmvdDistance[x0][y0].

mmvd_direction_idx[x0][y0] specifies index used to derive MmvdSign[x0][y0].

merge_subblock_flag[x0][y0] specifies the subblock-based inter prediction parameters for the current coding. That is, merge_subblock_flag may represents whether a subblock merge mode (or affine merge mode) is applied to the current block.

merge_subblock_idx[x0][y0] specifies the merging candidate index of the subblock-based merging candidate list.

ciip_flag[x0][y0] specifies whether the combined inter-picture merge and intra-picture prediction is applied for the current coding unit.

merge_triangle_idx0[x0][y0] specifies the first merging candidate index of the triangular shape based motion compensation candidate list.

merge_triangle_idx[x0][y0] specifies the second merging candidate index of the triangular shape based motion compensation candidate list.

merge_jdx[x0][y0] specifies the merging candidate index of the merging candidate list.

Meanwhile, referring back to the CU syntax of Table 1, mvp_10_flag[x0][y0] specifies the motion vector predictor index of list 0. That is, when the MVP mode is applied, mvp_10_flag may represent a candidate selected for MVP derivation of the current block from the MVP candidate list 0.

ref_idx_11[x0][y0] has the same semantics as ref_idx_10, with 10 and list 0 may be replaced by 11 and list 1, respectively. (ref_idx_11[x0][y0] has the same semantics as ref_idx_10, with 10, L0 and list 0 replaced by 11, L1 and list 1, respectively.)

inter_pred_idc[x0][y0] specifies whether list0, list1, or bi-prediction is used for the current coding unit.

sym_mvd_flag[x0][y0] equal to 1 specifies that the syntax elements ref_idx_10[x0][y0] and ref_idx_11[x0][y0], and the mvd_coding(x0, y0, refList,cpIdx) syntax structure for refList equal to 1 are not present. That is, sym_mvd_flag represents whether symmetric MVD is used in mvd coding.

ref_idx_10[x0][y0] specifies the list 0 reference picture index for the current coding unit.

ref_idx_11 [x0] [y0] has the same semantics as ref_idx_10, with 10, L0 and list 0 replaced by 11, L1 and list 1, respectively.

inter_affine_flag[x0][y0] equal to 1 specifies that for the current coding unit, when decoding a P or B slice, affine model based motion compensation is used to generate the prediction samples of the current coding unit.

cu_affine_type_flag[x0][y0] equal to 1 specifies that for the current coding unit, when decoding a P or B slice, 6-parameter affine model based motion compensation is used to generate the prediction samples of the current coding unit. Cu_affine_type_flag[x0][y0] equal to 0 specifies that 4-parameter affine model based motion compensation is used to generate the prediction samples of the current coding unit.

amvr_flag[x0][y0] specifies the resolution of motion vector difference. The array indices x0, y0 specify the location (x0, y0) of the top-left luma sample of the considered coding block relative to the top-left luma sample of the picture. Amvr_flag[x0][y0] equal to 0 specifies that the resolution of the motion vector difference is ¼ of a luma sample.

Amvr_flag[x0][y0] equal to 1 specifies that the resolution of the motion vector difference is further specified by amvr_precision_flag[x0][y0].

amvr_precision_flag[x0][y0] equal to 0 specifies that the resolution of the motion vector difference is one integer luma sample if inter_affine_flag[x0][y0] is equal to 0, and ¹⁄₁₆ of a luma sample otherwise. Amvr_precision_flag[x0][y0] equal to 1 specifies that the resolution of the motion vector difference is four luma samples if inter_affine_flag[x0][y0] is equal to 0, and one integer luma sample otherwise. The array indices x0, y0 specify the location (x0, y0) of the top-left luma sample of the considered coding block relative to the top-left luma sample of the picture.

bcw_idx[x0][y0] specifies the weight index of bi-prediction with CU weights.

When the (inter) prediction mode for the current block is determined, the coding apparatus derives motion information for the current block based on the prediction mode (S610).

The coding apparatus may perform inter prediction using motion information of the current block. The encoding apparatus may derive optimal motion information for the current block through a motion estimation procedure. For example, the encoding apparatus may search for a similar reference block with high correlation within a predetermined search range in the reference picture in fractional pixel units by using the original block in the original picture with respect to the current block and derive motion information therethrough. The block similarity may be derived based on a difference between phase-based sample values. For example, the block similarity may be calculated based on the SAD between the current block (or the template of the current block) and the reference block (or the template of the reference block). In this case, motion information may be derived based on a reference block having the smallest SAD in the search area. The derived motion information may be signaled to the decoding apparatus according to various methods based on the inter prediction mode.

When the motion information on the current block is derived, the coding apparatus performs inter prediction based on the motion information on the current block (S620). The coding apparatus may derive prediction sample(s) for the current block based on the motion information. The current block including the prediction samples may be referred to as a predicted block.

Reconstructed samples and a reconstructed picture may be generated based on the derived prediction samples, and then procedures such as in-loop filtering may be performed.

Figure 7:
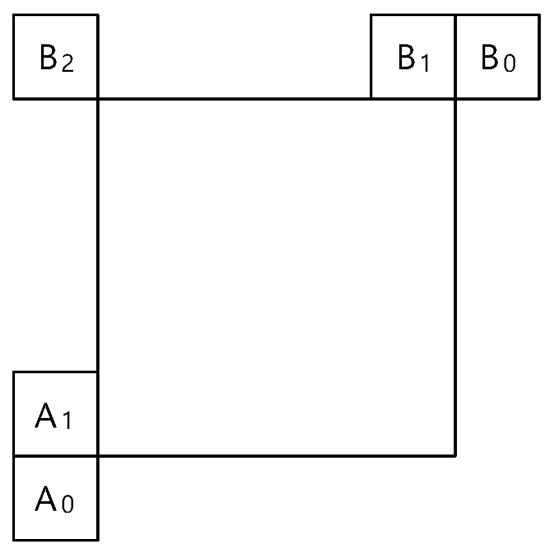
FIG. 7 is a diagram illustrating a spatial candidate that may be used for inter prediction.

FIG. 7 is a diagram illustrating a merge mode and a skip mode that may be used for inter prediction.

When a merge mode is applied during inter prediction, motion information of the current block is not directly transmitted, but motion information of the current block is derived using motion information of a neighboring prediction block. Accordingly, the encoding apparatus may indicate motion information of the current block by transmitting flag information indicating that the merge mode is used and a merge index indicating which of the surrounding prediction blocks is used. The merge mode may be referred to as a regular merge mode.

In order to perform the merge mode, the coding apparatus searches for a merge candidate block used to derive motion information of the current block. For example, up to five merge candidate blocks may be used, but the present embodiment is not limited thereto. Also, information on the maximum number of merge candidate blocks may be transmitted in a slice header or a tile group header, but the present embodiment is not limited thereto. After finding the merge candidate blocks, the coding apparatus may generate a merge candidate list and may select a merge candidate block having the smallest cost, among the merge candidate blocks, as a final merge candidate block.

This document provides various embodiments of merge candidate blocks constituting the merge candidate list.

The merge candidate list may include, for example, five merge candidate blocks. For example, four spatial merge candidates and one temporal merge candidate may be used. As a specific example, in the case of a spatial merge candidate, blocks $A_0$, $A_1$, $B_0$, $B_1$, and $B_2$ shown in FIG. 7 may be used as spatial merge candidates. Hereinafter, the spatial merge candidate or a spatial MVP candidate to be described later may be referred to as an SMVP, and the temporal merge candidate or a temporal MVP candidate to be described later may be referred to as a TMVP.

The merge candidate list for the current block may be constructed, for example, based on the following procedure.

First, the coding apparatus (encoding apparatus/decoding apparatus) may insert spatial merge candidates derived by searching for spatial neighboring blocks of the current block into the merge candidate list. For example, the spatial neighboring blocks may include a lower-left corner neighboring block $A_0$, a left neighboring block $A_1$, an upper-right corner neighboring block $B_0$, an upper neighboring block $B_1$, and an upper-left corner neighboring block $B_2$ of the current block. However, this is an example, and in addition to the spatial neighboring blocks described above, additional neighboring blocks such as a right neighboring block, a lower neighboring block, and a lower-right neighboring block may be further used as the spatial neighboring blocks. The coding apparatus may detect available blocks by searching the spatial neighboring blocks based on priorities, and may derive motion information of the detected blocks as the spatial merge candidates. For example, the encoding apparatus and/or the decoding apparatus may search for five blocks shown in FIG. 7 in the order of $A_1$, $B_1$, $B_0$, $A_0$, and $B_2$, and sequentially indexes the available candidates to form a merge candidate list.

Also, the coding apparatus may insert a temporal merge candidate derived by searching for a temporal neighboring block of the current block into the merge candidate list. The temporal neighboring block may be located on a reference picture that is a different picture from the current picture in which the current block is located. The reference picture in which the temporal neighboring block is located may be called a collocated picture or a col picture. The temporal neighboring block may be searched for in the order of a lower-right corner neighboring block and a lower-right center block of a co-located block with respect to the current block on the col picture.

Meanwhile, the coding apparatus may check whether the number of current merge candidates is smaller than a maximum number of merge candidates. The maximum number of merge candidates may be predefined or signaled from the encoding apparatus to the decoding apparatus. For example, the encoding apparatus may generate information on the maximum number of merge candidates, encode and transmit the information in the form of a bitstream to the decoding apparatus. When the maximum number of merge candidates is filled, a subsequent candidate addition process may not be performed.

When the number of current merge candidates is smaller than the maximum number of merge candidates as a result of the checking, the coding apparatus may insert an additional merge candidate into the merge candidate list. The additional merge candidates may include, for example, history based merge candidate(s), pair-wise average merge candidate(s), ATMVP, and combined bi-predictive merge candidates (when a slice/tile group type of the current slice/tile group is type B) and/or a zero vector merge candidate.

If the number of the current merge candidates is not less than the maximum number of merge candidates as a result of the checking, the coding apparatus may terminate the construction of the merge candidate list. In this case, the encoding apparatus may select an optimal merge candidate from among the merge candidates constituting the merge candidate list based on a rate-distortion (RD) cost and signal selection information (e.g., a merge index) indicating the selected merge candidate to the decoding apparatus. The decoding apparatus may select the optimal merge candidate based on the merge candidate list and the selection information.

As described above, the motion information of the selected merge candidate may be used as the motion information of the current block, and prediction samples of the current block may be derived based on the motion information of the current block. The encoding apparatus may derive residual samples of the current block based on the prediction samples, and may signal residual information on the residual samples to the decoding apparatus. As described above, the decoding apparatus may generate reconstructed samples based on the residual samples derived based on the residual information and the prediction samples, and generate a reconstructed picture based thereon.

When a skip mode is applied during inter prediction, motion information of the current block may be derived in the same manner as that when the merge mode is applied as described above. However, when the skip mode is applied, a residual signal for the corresponding block is omitted, so that the prediction samples may be directly used as the reconstructed samples.

Figure 8:
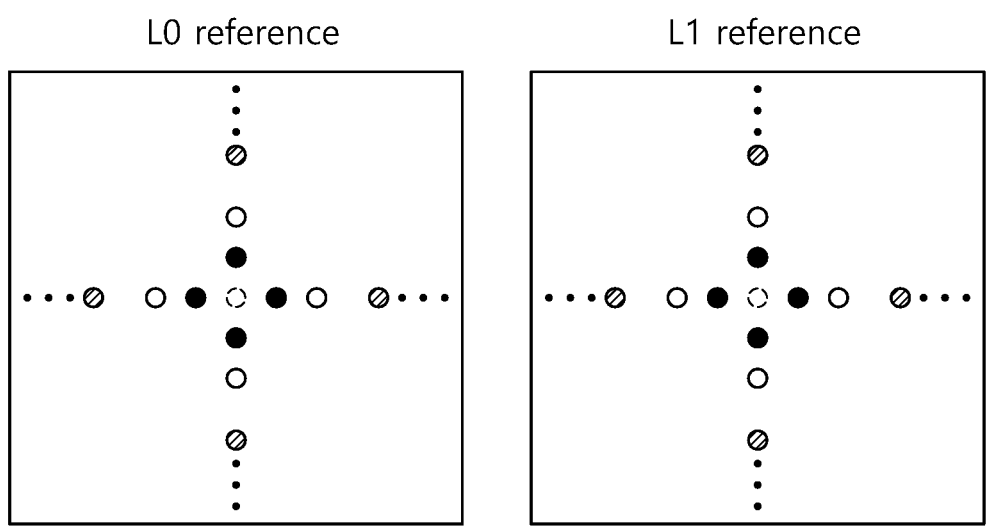
FIG. 8 is a diagram illustrating a merge mode having a motion vector difference that may be used in inter prediction.

FIG. 8 is a diagram illustrating a merge mode having a motion vector difference that may be used in inter prediction.

In addition to merge mode, where the implicitly derived motion information is directly used for prediction samples generation of the current CU, the merge mode with motion vector differences (MMVD) is introduced in VVC. Because similar motion information derivation methods are used for the skip mode and the merge mode, MMVD may be applied to the skip mode. An MMVD flag (ex. Mmvd_flag) may be signaled right after sending a skip flag and merge flag to specify whether MMVD mode is used for a CU.

In MMVD, after a merge candidate is selected, it is further refined by the signaled MVDs information. When MMVD is applied to the current block (i.e. When the mmvd_flag is equal to 1), further information for the MMVD may be signaled.

The further information includes a merge candidate flag (ex. Mmvd_merge_flag) indicating whether the first (0) or the second (1) candidate in the merging candidate list is used with the motion vector difference, an index to specify motion magnitude (ex. Mmvd_distance_idx), and an index for indication of motion direction (ex. Mmvd_direction_idx). In MMVD mode, one for the first two candidates in the merge list is selected to be used as MV basis. The merge candidate flag is signaled to specify which one is used.

Distance index specifies motion magnitude information and indicate the pre-defined offset from the starting point.

As shown in FIG. 8, an offset is added to either horizontal component or vertical component of starting MV. The relation of distance index and pre-defined offset is specified in Table 3.

TABLE 3

| mmvd_distance_idx[ x0 ][ y0 ] | MmvdDistance[ x0 ][ y0 ] | |
|---|---|---|
| | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Here, slice_fpel_mmvd_enabled_flag equal to 1 specifies that merge mode with motion vector difference uses integer sample precision in the current slice. Slice_fpel_mmvd_enabled_flag equal to 0 specifies that merge mode with motion vector difference may use fractional sample precision in the current slice. When not present, the value of slice_fpel_mmvd_enabled_flag is inferred to be 0. Slice_fpel_mmvd_enabled_flag syntax element may be signaled through (may be comprised in) a slice header.

Direction index represents the direction of the MVD relative to the starting point. The direction index may represent of the four directions as shown in Table 4. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 4 specifies the sign of MV offset added to the starting MV. When the starting MVs is an un-prediction MV or bi-prediction MVs with both lists point to the same side of the current picture (i.e. POCs of two references are both larger than the POC of the current picture, or are both smaller than the POC of the current picture), the sign in Table 4 specifies the sign of MV offset added to the starting MV.

TABLE 4

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows.

$$MmvdOffset[x0][y0][0] = \qquad \text{[Equation 1]}$$
$$(MmvdDistance[x0][y0] << 2) * MmvdSign[x0][y0][0]$$

$$MmvdOffset[x0][y0][1] =$$
$$(MmvdDistance[x0][y0] << 2) * MmvdSign[x0][y0][1]$$

Figure 9:
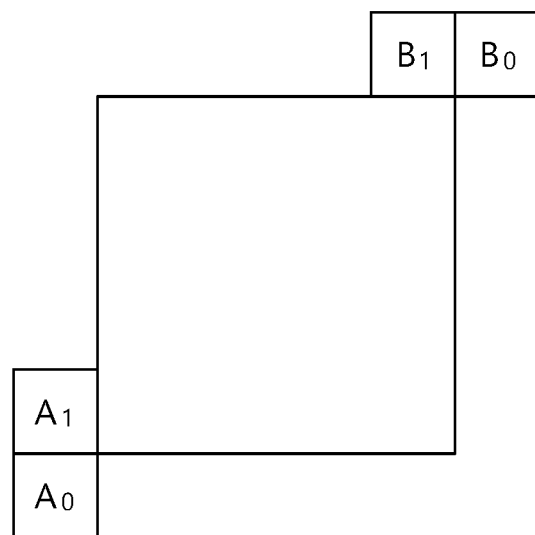
FIGS. 9 and 10 are diagrams illustrating a subblock-based temporal motion vector prediction process that may be used in inter prediction.
Figure 10:
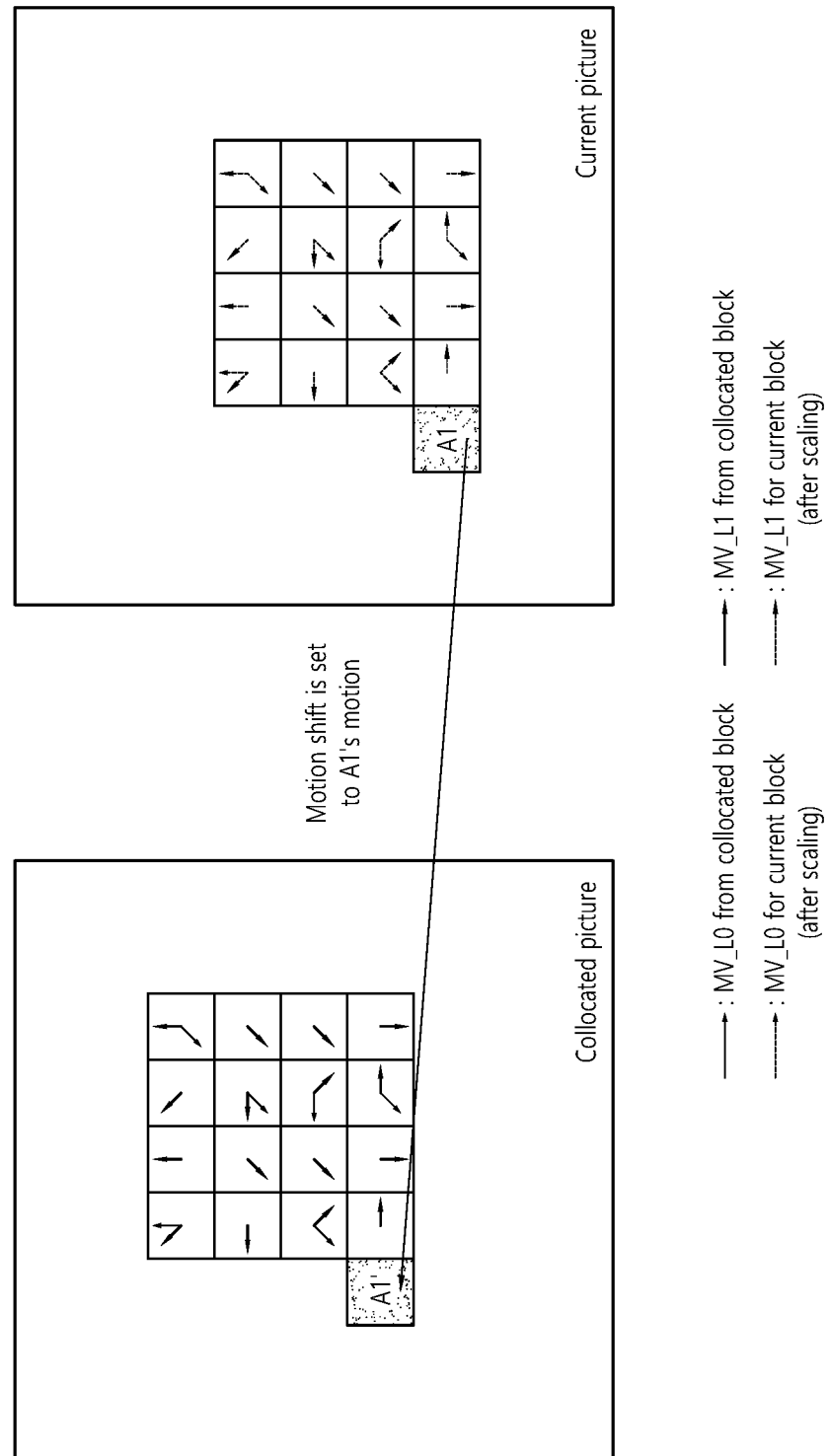

FIGS. 9 and 10 are diagrams illustrating a subblock-based temporal motion vector prediction process that may be used in inter prediction.

Subblock-based temporal motion vector prediction (SbTMVP) method may be used for inter prediction. Similar to the temporal motion vector prediction (TMVP), SbTMVP uses the motion field in the collocated picture to improve motion vector prediction and merge mode for CUs in the current picture. The same collocated picture used by TMVP is used for SbTVMP. SbTMVP differs from TMVP in the following two main aspects.

1. TMVP predicts motion at CU level but SbTMVP predicts motion at sub-CU level.
2. Whereas TMVP fetches the temporal motion vectors from the collocated block in the collocated picture (the collocated block is the bottom-right or center (below-right center) block relative to the current CU), SbTMVP applies a motion shift before fetching the temporal motion information from the collocated picture, where the motion shift is obtained from the motion vector from one of the spatial neighbouring blocks of the current CU.

FIGS. 9 and 10 show the SbTVMP process. SbTMVP predicts the motion vectors of the sub-CUs within the current CU in two steps. In the first step, the spatial neighbour A1 in FIG. 9 is examined. If A1 has a motion vector that uses the collocated picture as its reference picture is identified, this motion vector (may be referred to as a temporal MV (tempVM)) is selected to be the motion shift to be applied. If no such motion is identified, then the motion shift is set to (0, 0).

In the second step, the motion shift identified in Step 1 is applied (i.e. Added to the current block's coordinates) to obtain sub-CU-level motion information (motion vectors and reference indices) from the collocated picture as shown in FIG. 10. The example in FIG. 10 assumes the motion shift is set to block A1's motion. Then, for each sub-CU, the motion information of its corresponding block (the smallest motion grid that covers the center sample) in the collocated picture is used to derive the motion information for the sub-CU. The center sample (below right center sample) may correspond to a below-right sample among 4 central samples in the sub-CU when the sub-block has even length width and height.

After the motion information of the collocated sub-CU is identified, it is converted to the motion vectors and reference indices of the current sub-CU in a similar way as the TMVP process, where temporal motion scaling may be applied to align the reference pictures of the temporal motion vectors to those of the current CU.

A combined sub-block based merge list which contains both SbTVMP candidate and affine merge candidates may be used for the signalling of affine merge mode (may be referred to as sub-block (based) merge mode). The SbTVMP mode is enabled/disabled by a sequence parameter set (SPS) flag. If the SbTMVP mode is enabled, the SbTMVP predictor is added as the first entry of the list of sub-block merge candidates, and followed by the affine merge candidates. The maximum allowed size of the affine merge candidate list may be 5.

The sub-CU size used in SbTMVP may be fixed to be 8×8, and as done for affine merge mode, SbTMVP mode may be only applicable to the CU with both width and height are larger than or equal to 8.

The encoding logic of the additional SbTMVP merge candidate is the same as for the other merge candidates, that is, for each CU in P or B slice, an additional RD check may be performed to decide whether to use the SbTMVP candidate.

Figure 11:
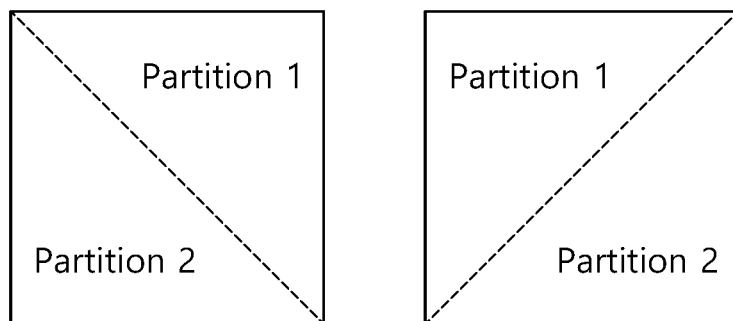
FIG. 11 is a diagram illustrating a partitioning mode applicable to inter prediction.

FIG. 11 is a diagram illustrating a partitioning mode applicable to inter prediction.

A triangle partition mode may be used for inter prediction. The triangle partition mode may be only applied to CUs that are 8×8 or larger. The triangle partition mode is signalled using a CU-level flag as one kind of merge mode, with other merge modes including the regular merge mode, the MMVD mode, the CIIP mode and the subblock merge mode.

When this mode is used, a CU may be split evenly into two triangle-shaped partitions, using either the diagonal split or the anti-diagonal split as shown in FIG. 11. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If triangle partition mode is used for the current CU, then a flag indicating the direction of the triangle partition (diagonal or anti-diagonal), and two merge indices (one for each partition) are further signalled. The number of maximum TPM candidate size is signalled explicitly at slice level and specifies syntax binarization for TMP merge indices. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored in 4×4 units. The triangle partition mode is not used in combination with SBT, that is, when the signalled triangle mode is equal to 1, the cu_sbt_flag is inferred to be 0 without signalling.

The uni-prediction candidate list is derived directly from the merge candidate list constructed as described above.

After predicting each triangle partition using its own motion, blending is applied to the two prediction signals to derive samples around the diagonal or anti-diagonal edge.

Figure 12:
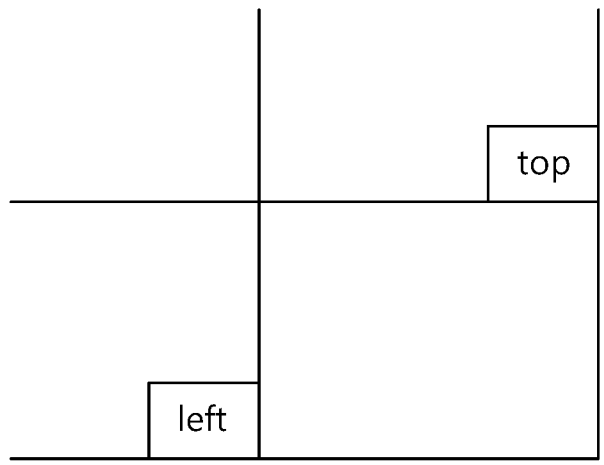
FIG. 12 is a diagram illustrating a CIIP mode applicable to inter prediction.

FIG. 12 is a diagram illustrating a CIIP mode applicable to inter prediction.

Combined inter and intra prediction may be applied to a current block. An additional flag (ex. Ciip_flag) may be signalled to indicate if the combined inter/intra prediction (CIIP) mode is applied to the current CU. For example, when a CU is coded in merge mode, if the CU contains at least 64 luma samples (that is, CU width times CU height is equal to or larger than 64), and if both CU width and CU height are less than 128 luma samples, the additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode P_inter is derived using the same inter prediction process applied to regular merge mode; and the intra prediction signal P_intra is derived following the regular intra prediction process with the planar mode. Then, the intra and inter prediction signals are combined using weighted averaging, where the weight value is calculated depending on the coding modes of the top and left neighbouring blocks (depicted in FIG. 12) as follows.

If the top neighbor is available and intra coded, then set isIntraTop to 1, otherwise set isIntraTop to 0.

If the left neighbor is available and intra coded, then set isIntraLeft to 1, otherwise set isIntraLeft to 0.

If (isIntraLeft+isIntraLeft) is equal to 2, then wt is set to 3.

Otherwise, if (isIntraLeft+isIntraLeft) is equal to 1, then wt is set to 2.

Otherwise, if (isIntraLeft+isIntraLeft) is equal to 1, then wt is set to 2.

The CIIP prediction is formed as follows.

$$P_{CIIP} = ((4 - \text{wt}) * P_{inter} + \text{wt} * P_{intra} + 2) >> 2 \qquad \text{[Equation 2]}$$

Meanwhile, in order to generate a prediction block, the coding apparatus may derive motion information based on the regular merge mode, skip mode, SbTMVP mode, MMVD mode, triangle partition mode (partitioning mode) and/or CIIP mode as described above. Each mode may be enabled/disabled through an on/off flag for each mode included in the sequence parameter set (SPS). If the on/off flag for a specific mode is disabled, the encoding apparatus does not signal a syntax explicitly transmitted for the corresponding prediction mode in units of CUs or PUs.

Therefore, when all of the specific modes for the merge/skip mode are disabled or partially disabled in the existing operation process, a problem in which the on/off flag is signaled redundantly arises. Therefore, in this document, in order to prevent the same information (flag) from being signaled redundantly in the process of selecting the merge mode applied to the current block based on the merge data syntax of Table 2, any one of the following methods may be used.

The encoding apparatus may signal a flag based on a sequence parameter set as shown in Table 5 below in order to select a prediction mode that may be used in the process of deriving motion information. Each prediction mode may be turned on/off based on the sequence parameter set of Table 5, and each syntax element of the merge data syntax of Table 2 may be parsed or may be induced according to a condition in which the flag of Table 5 and each mode are used.

TABLE 5

| | Descriptor |
|---|---|
| seq_parameter_set_rbsp( ) { | |
|     sps_decoding_parameter_set_id | u(4) |
|     sps_max_sub_layers_minus1 | u(3) |
|     sps_reserved_zero_5bits | u(5) |
|     profile_tier_level( sps_max_sub_layers_minus1 ) | |
|     gra_enabled_flag | u(1) |
|     sps_seq_parameter_set_id | ue(v) |
|     chroma_format_idc | ue(v) |
|     if( chroma_format_idc = = 3 ) | |
|         separate_colour_plane_flag | u(1) |
|     pic_width_in_luma_samples | ue(v) |
|     pic_height_in_luma_samples | ue(v) |
|     conformance_window_flag | u(1) |
|     if( conformance_window_flag ) { | |
|         conf_win_left_offset | ue(v) |
|         conf_win_right_offset | ue(v) |
|         conf_win_top_offset | ue(v) |
|         conf_win_bottom_offset | ue(v) |
|     } | |
|     bit_depth_luma_minus8 | ue(v) |
|     bit_depth_chroma_minus8 | ue(v) |
|     log2_max_pic_order_cnt_lsb_minus4 | ue(v) |
|     sps_sub_layer_ordering_info_present_flag | u(1) |
|     for( i = ( sps_sub_layer_ordering_info_present_flag ? 0 : sps_max_sub_layers_minus1 ); | |
|         i <= sps_max_sub_layers_minus1; i++ ) { | |
|         sps_max_dec_pic_buffering_minus1[ i ] | ue(v) |
|         sps_max_num_reorder_pics[ i ] | ue(v) |
|         sps_max_lateney_increase_plus1[ i ] | ue(v) |
|     } | |
|     long_term_ref_pics_flag | u(1) |
|     sps_idr_rpl_present_flag | u(1) |
|     rpl1_same_as_rpl0_flag | u(1) |
|     for( i = 0; i < !rpl1_same_as_rpl0_flag ? 2 : 1; i++ ) { | |
|         num_ref_pic_lists_in_sps[ i ] | ue(v) |
|         for( j = 0; j < num_refo_pic_lists_in_sps[ i ]; j++) | |
|             ref_pic_list_struct( i, j ) | |
|     } | |
|     qtbtt_dual_tree_intra_flag | u(1) |
|     log2_ctu_size_minus2 | ue(v) |
|     log2_min_luma_coding_block_size_minus2 | ue(v) |
|     partition_constraints_override_enabled_flag | u(1) |
|     sps_log2_diff_min_qt_min_cb_intra_slice_luma | ue(v) |
|     sps_log2_diff_min_qt_min_cb_inter_slice | ue(v) |
|     sps_max_mtt_hierarchy_depth_inter_slice | ue(v) |
|     sps_max_mtt_hierarchy_depth_intra_slice_luma | ue(v) |
|     if( sps_max_mtt_hierarchy_depth_intra_slice_liuna != 0 ) { | |
|         sps_log2_diff_max_bt_min_qt_intra_slice_luma | ue(v) |
|         sps_log2_diff_max_tt_min_qt_intra_slice_luma | ue(v) |
|     } | |
|     if( sps_max_mtt_hierarchy_depth_inter_slices != 0 ) { | |
|         sps_log2_diff_max_bt_min_qd_inter_slice | ue(v) |
|         sps_log2_diff_max_tt_min_qt_inter_slice | ue(v) |
|     } | |
|     if( qtbtt_dual_tree_intra_flag ) { | |
|         sps_log2_diff_min_qt_min_cb_intra_slice_chroma | ue(v) |
|         sps_max_mtt_hierarchy_depth_intra_slice_chroma | ue(v) |
|         if ( sps_max_mtt_hierarchy_depth_intra_slice_chroma != 0 ) { | |
|             sps_log2_diff_max_bt_min_qt_intra_slice_chroma | ue(v) |
|             sps_log2_diff_max_tt_min_qt_intra_slice_chroma | ue(v) |
|         } | |
|     } | |
|     sps_sao_enabled_flag | u(1) |
|     sps_alf_enabled_flag | u(1) |
|     sps_pcm_enabled_flag | u(1) |
|     if( sps_pcm_enabled_flag ) { | |
|         pcm_sample_bit_depth_luma_minus1 | u(4) |
|         pcm_sample_bit_depth_chroma_minus1 | u(4) |
|         log2_min_pcm_luma_coding_block_size_minus3 | ue(v) |
|         log2_diff_max_min_pcm_luma_coding_block_size | ue(v) |
|         pcm_loop_filter_disabled_flag | u(1) |
|     } | |
|     if( ( CtbSizeY / MinCbSizeY + 1) <= ( pic_width_in_luma_samples / MinCbSizeY − 1 ) ) { | |
|         sps_ref_wraparound_enabled_flag | u(1) |
|         if( sps_ref_wraparound_enabled_flag ) | |
|             sps_ref_wraparound_offset_minus1 | ue(v) |
|     } | |

TABLE 5-continued

| | Descriptor |
|---|---|
| sps_temporal_mvp_enabled_flag | u(1) |
| if( sps_temporal_mvp_enabled_flag ) | |
|     sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_affine_amvr_enabled_flag | u(1) |
| sps_dmvr_enabled_flag | u(1) |
| sps_mmvd_enabled_flag | u(1) |
| sps_cclm_enabled_flag | |
| if( sps_cclm_enabled_flag && chroma_format_idc = = 1 ) | |
|     sps_cclm_colocated_chroma_flag | u(1) |
| sps_mts_enabled_flag | u(1) |
| if( sps_mts_enabled_flag ) { | |
|     sps_explicit_mts_intra_enabled_flag | u(1) |
|     sps_explicit_mts_inter_enabled_flag | u(1) |
| } | |
| sps_sbt_enabled_flag | u(1) |
| if( sps_sbt_enabled_flag ) | |
|     sps_sbt_max_size_64_flag | u(1) |
| sps_affine_enabled_flag | u(1) |
| if( sps_affine_enabled_flag ) | |
|     sps_affine_type_flag | u(1) |
| sps_gbi_enabled_flag | u(1) |
| sps_ibc_enabled_flag | u(1) |
| sps_ciip_enabled_flag | u(1) |
| if( sps_mmvd_enabled_flag ) | |
|     sps_fpel_mmvd_enabled_flag | u(1) |
| sps_triangle_enabled_flag | u(1) |
| sps_lmcs_enabled_flag | u(1) |
| sps_ladf_enabled_flag | u(1) |
| if ( sps_ladf_enabled_flag ) | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) | |
|         sps_ladf_qp_offset[ i ] | se(v) |
|         sps_ladf_delta_threshold_minus1[ i ] | ue(v) |
|     } | |
| } | |
| sps_extension_flag | u(1) |
| if( sps_extension_flag ) | |
|     while( more_rbsp_data( ) ) | |
|         sps_extension_data_flag | u(1) |
| rbsp_railing_bits( ) | |
| } | |

The following drawings are prepared to explain a specific example of this document. Since the names of specific devices or names of specific signals/information described in the drawings are presented by way of example, the technical features of the present disclosure are not limited to the specific names used in the following drawings.

Figure 13:
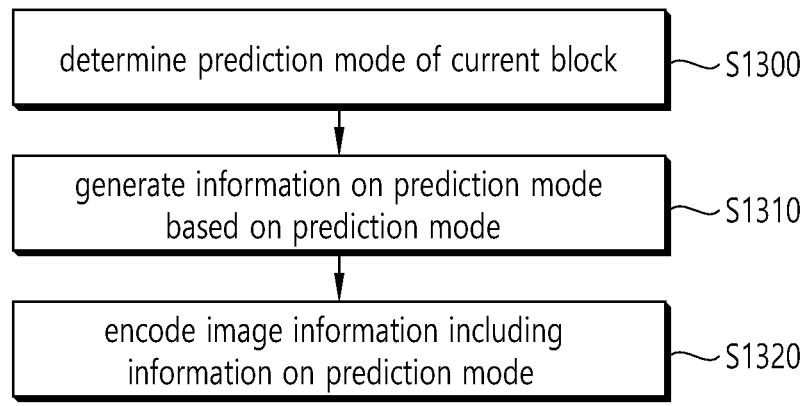
FIGS. 13 and 14 schematically show an example of a video/image encoding method including an inter prediction method and related components according to an embodiment of the present disclosure.
Figure 14:
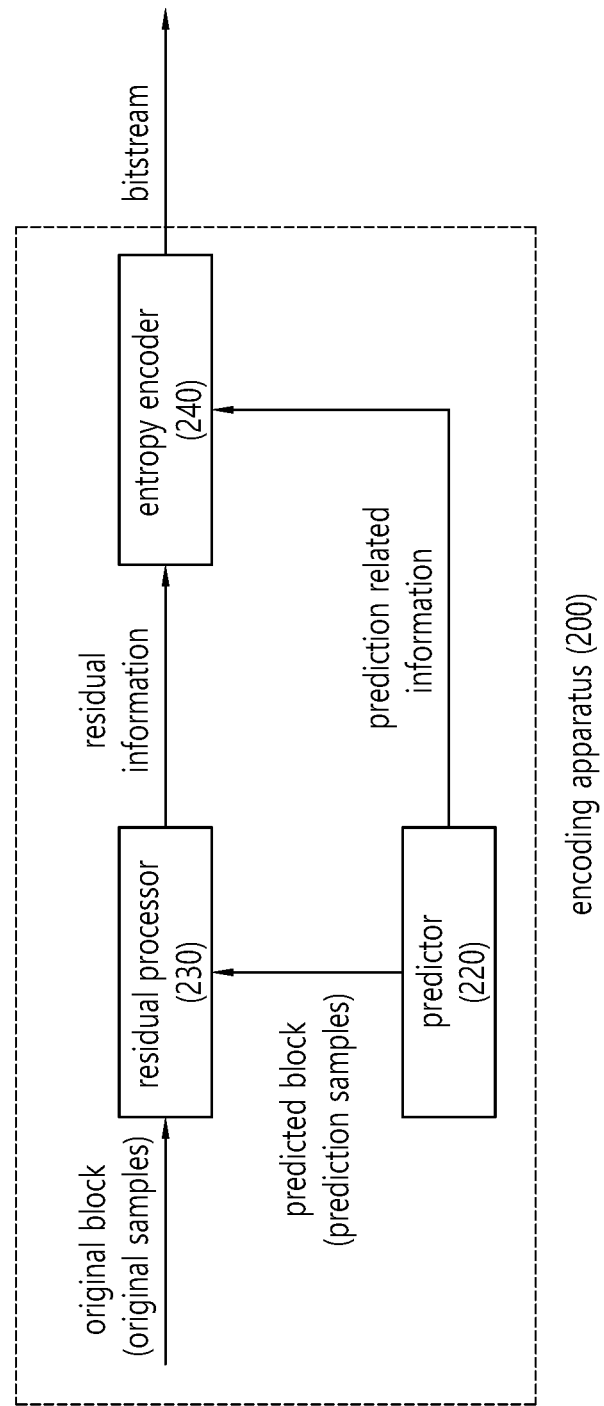

FIGS. 13 and 14 schematically show an example of a video/image encoding method including an inter prediction method and related components according to an embodiment of the present disclosure.

The encoding method disclosed in FIG. 13 may be performed by the encoding apparatus 200 illustrated in FIG. 2. Specifically, for example, steps S1300 and S1310 of FIG. 13 may be performed by the predictor 220 of the encoding apparatus 200, and step S1320 may be performed by the entropy encoder 240 of the encoding apparatus 200. The encoding method disclosed in FIG. 13 may include the embodiments described above in this document.

Specifically, referring to FIGS. 13 and 14, the predictor of the encoding apparatus may determine the prediction mode of the current block (S1300). For example, when inter prediction is applied to the current block, the predictor of the encoding apparatus may determine any one of the regular merge mode, the skip mode, the MMVD mode, the subblock merge mode, the partitioning mode, and the CIIP mode as a prediction mode of the current block.

Here, the regular merge mode may be defined as a mode in which motion information of the current block is derived using motion information of a neighboring block. The skip mode may be defined as a mode in which a prediction block is used as a reconstructed block. The MMVD mode is applied to the merge mode or the skip mode and may be defined as a merge (or skip) mode using a motion vector difference. The subblock merge mode may be defined as a merge mode based on a subblock. The partitioning mode may be defined as a mode for performing prediction by dividing the current block into two partitions (diagonal or anti-diagonal). The CIIP mode may be defined as a mode in which inter-picture merge and intra-picture prediction are combined.

Meanwhile, the predictor of the encoding apparatus may search for a block similar to the current block within a certain region (search region) of reference pictures through motion estimation, derive a reference block having a difference which is minimum or a certain reference or less from the current block, and derive a reference picture index indicating a reference picture in which the reference block is positioned based thereon. In addition, a motion vector may be derived based on a position difference between the reference block and the current block.

The predictor of the encoding apparatus may generate prediction samples (prediction block) of the current block based on the prediction mode of the current block and the motion vector of the current block. In addition, the predictor of the encoding apparatus may generate information on the prediction mode based on the prediction mode (S1310). Here, the information on the prediction mode may include inter/intra prediction classification information, inter prediction mode information, and the like, and may include various syntax elements related thereto.

The residual processor of the encoding apparatus may generate residual samples based on original samples (original block) of the current block and prediction samples (prediction block) of the current block. In addition, information on the residual samples may be derived based on the residual samples.

The encoder of the encoding apparatus may encode image information including information on the residual samples, information on the prediction mode, and the like (S1320). The image information may include partitioning related information, information on a prediction mode, residual information, in-loop filtering related information, and the like, and may include various syntax elements related thereto. Information encoded by the encoder of the encoding apparatus may be output in the form of a bitstream. The bitstream may be transmitted to the decoding apparatus through a network or a storage medium.

For example, the image information may include information on various parameter sets, such as an adaptation parameter set (APS), a picture parameter set (PPS), a sequence parameter set (SPS), or a video parameter set (VPS). In addition, the image information may include information on the prediction mode of the current block, such as a coding unit syntax and merge data syntax. Here, the sequence parameter set may include a combined inter-picture merge and intra-picture prediction (CIIP) enabled flag, a partitioning mode enabled flag, and the like. The coding unit syntax may include a CU skip flag indicating whether the skip mode is applied to the current block.

According to an embodiment, as an example, the encoding apparatus may include a regular merge flag in the image information based on that a condition based on the CIIP enabled flag and a condition based on a size of the current block is satisfied so that the same syntax is not repeatedly transmitted. Here, the condition based on the size of the current block may be a case in which a product of a height of the current block and a width of the current block is 64 or greater and the height of the current block and the width of the current block are each smaller than 128. The condition based on the CIIP enabled flag may be a case in which a value of the CIIP enabled flag is 1. In other words, when the product of the height of the current block and the width of the current block is 64 or greater, the height of the current block and the width of the current block are each smaller than 128, and the value of the CIIP enabled flag is 1, the encoding apparatus may then signal the regular merge flag.

As another example, the encoding apparatus may include the regular merge flag in the image information based on that a condition based on the CU skip flag and the size of the current block is satisfied. Here, the condition based on the CU skip flag may be a case in which a value of the CU skip flag is 0. In other words, when the product of the height of the current block and the width of the current block is 64 or greater, the height of the current block and the width of the current block are smaller than 128, and the value of the CU skip flag is 0, the encoding apparatus may then signal the regular merge flag.

As another example, the encoding apparatus may include the regular merge flag in the image information based on that the condition based on the CU skip flag is further satisfied in addition to the condition based on the CIIP enabled flag and the condition based on the size of the current block. Here, the condition based on the CU skip flag may be a case in which the value of the CU skip flag is 0. In other words, when the product of the height of the current block and the width of the current block is 64 or greater, the height of the current block and the width of the current block are less than 128, the value of the CIIP enabled flag is 1, and a value of the CU skip flag is 0, the encoding apparatus may then signal the regular merge flag.

As another example, the encoding apparatus may include a regular merge flag in the image information based on that a condition based on the information on the current block and the partitioning mode enabled flag is satisfied. Here, the condition based on the information on the current block may include a case in which the product of the width and the height of the current block is 64 or greater and/or a case in which a slice type including the current block is a B slice. The condition based on the partitioning mode enabled flag may be a case in which the value of the partitioning mode enabled flag is 1. In other words, when both the condition based on the height of the current block and information on the current block and the condition based on the partitioning mode enabled flag are satisfied, the encoding apparatus may signal the regular merge flag.

When the condition based on the CIIP enabled flag and the condition based on the size of the current block are not satisfied, the encoding apparatus may determine whether the condition based on the information on the current block and the partitioning mode enabled flag is satisfied. Alternatively, when the condition based on the information on the current block and the partitioning mode enabled flag is not satisfied, the encoding apparatus may determine whether the condition based on the CIIP enabled flag and the condition based on the size of the current block are satisfied.

Meanwhile, when the product of the width and height of the current block is not 32 and the value of the MMVD enabled flag is 1 or when the maximum number of subblock merge candidates is greater than 0 and the width and height of the current block are 8 or greater, the encoding apparatus may signal the regular merge flag.

To this end, as an example, the merge data syntax may be configured as shown in Table 6 below.

TABLE 6

| | Descriptor |
|---|---|
| merge_data( x0, y0, cbWidth, cbHeight ) { <br>    if ( CuPredMode[ x0 ][ y0 ] = = MODE_IBC ) { <br>        if( MaxNumMergeCand > 1 ) <br>            merge_idx[ x0 ][ y0 ] <br>    } else { <br>        if((cbWidth * cbHeight !=32) && <br>            ((sps_mmvd_enabled_flag) \|\| <br>            (MaxNumSubblockMergeCand > 0 && cbWidth >= 8 && cbHeight >= 8) \|\| <br>            (sps_ciip_enabled_flag && cu_skip_flag[ x0 ][ y0 ] = = 0 && | <br><br><br><br>ae(v) |

TABLE 6-continued

| | Descriptor |
|---|---|
| (cbWidth * cbHeight ) >= 64 && cbWidth < 128 && cbHeight < 128) \|\| | |
| (sps_triangle_enabled_flag && cbWidth * cbHeight>=64 && | |
| MaxNumTriangleMergeCand>=2 && slice_type = = B_SLICE))) | |
|     regular_merge_flag[ x0 ][ y0 ] | ae(v) |
| if ( regular_merge_flag[ x0 ][ y0 ] = = 1 ){ | |
|   if( MaxNumMergeCand > 1 ) | |
|     merge_idx[ x0 ][ y0 ] | ae(v) |
| } else { | |
|   if( sps_mmvd_enabled_flag && cbWidth * cbHeight != 32 ) | |
|     mmvd_merge_flag[ x0 ][ y0 ] | ae(v) |
|   if( mmvd_merge_flag[ x0 ][ y0 ] = = 1 ) { | |
|     if( MaxNumMergeCand > 1 ) | |
|       mmvd_cand_flag[ x0 ][ y0 ] | ae(v) |
|     mmvd_distance_idx[ x0 ][ y0 ] | ae(v) |
|     mmvd_direction_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( sps_ciip_enabled_flag && cu_skip_flag[ x0 ][ y0 ] = = 0 && | |
|         ( cbWidth * cbHeight ) >= 64 && cbWidth < 128 && cbHeight < 128 ) { | |
|         ciip_flag[ x0 ][ y0 ] | ae(v) |
|       if( ciip_flag[ x0 ][ y0 ] && MaxNumMergeCand > 1 ) | |
|         merge_idx[ x0 ][ y0 ] | ae(v) |
|       } | |
|       if( MergeTriangleFlag[ x0 ][ y0 ] ) { | |
|         merge_triangle_split_dir[ x0 ][ y0 ] | ae(v) |
|         merge_triangle_idx0[ x0 ][ y0 ] | ae(v) |
|         merge_triangle_idx1[ x0 ][ y0 ] | ae(v) |
|       } | |
|     } | |
|   } | |
| } | |
| } | |

In table 6, regular_merge_flag[x0][y0] equal to 1 specifies that regular merge mode is used to generate the inter prediction parameters of the current coding unit. The array indices x0, y0 specify the location (x0, y0) of the top-left luma sample of the considered coding block relative to the top-left luma sample of the picture.

When regular_merge_flag[x0][y0] is not present, it is inferred as follows.

If all of the following conditions are true, regular_merge_flag[x0][y0] is inferred to be equal to 1.
  general_merge_flag[x0][y0] is equal to 1
  sps_mmvd_enable_flag is equal to 0 or cbWidth*cbHeight==32)
  MaxNumSubblockMergeCand<=0 or cbWidth<8 or cbHeight<8
  sps_ciip_enabled_flag is equal to 0 or cbWidth*cbHeight<64 or cbWidth>=128 or cbHeight>=128 or cu_skip_flag[x0][y0] is equal to 1
  sps_triangle_enabled_flag is equal to 0 or MaxNumTriangleMergeCand<2 or slice_type is not equal to B_SLICE Otherwise, regular_merge_flag[x0][y0] is inferred to be equal to 0.

Meanwhile, according to another embodiment, as an example, the encoding apparatus may include the MMVD merge flag in the image information based on that the condition based on the CIIP enabled flag and the condition based on the size of the current block is satisfied so that the same syntax is not repeatedly transmitted. Here, the condition based on the size of the current block may be a case in which the product of the height of the current block and the width of the current block is 64 or greater and the height of the current block and the width of the current block are each smaller than 128. The condition based on the CIIP enabled flag may be a case in which the value of the CIIP enabled flag is 1. In other words, when the product of the height of the current block and the width of the current block is 64 or greater, the height of the current block and the width of the current block are smaller than 128, and the value of the CIIP enabled flag is 1, the encoding apparatus may signal the MMVD merge flag.

As another example, the encoding apparatus may include the MMVD merge flag in the image information based on that the condition based on the CU skip flag is further satisfied in addition to the condition based on the CIIP enabled flag and the condition based on the size of the current block. Here, the condition based on the CU skip flag may be a case in which the value of the CU skip flag is 0. In other words, when the product of the height of the current block and the width of the current block is 64 or greater, the height of the current block and the width of the current block are each smaller than 128, the value of the CIIP enabled flag is 1, and the value of the CU skip flag is 0, the encoding apparatus may then signal the MMVD merge flag.

As another example, the encoding apparatus may include the MMVD merge flag in the image information based on that the condition based on the information on the current block and the partitioning mode enabled flag are satisfied.

Here, the condition based on the information on the current block may include the case in which the product of the width and the height of the current block is 64 or greater and/or a case in which a slice type including the current block is a B slice. The condition based on the partitioning mode enabled flag may be a case in which the value of the partitioning mode enabled flag is 1. In other words, the encoding apparatus may signal the MMVD merge flag when both the condition based on the height of the current block and information on the current block and the condition based on the partitioning mode enabled flag are satisfied.

When the condition based on the CIIP enabled flag and the condition based on the size of the current block are not satisfied, the encoding apparatus may determine whether the condition based on the information on the current block and the partitioning mode enabled flag are satisfied. Alternatively, when the condition based on the information on the current block and the partitioning mode enabled flag are not satisfied, the encoding apparatus may determine whether the condition based on the CIIP enabled flag and the condition based on the size of the current block are satisfied.

Meanwhile, when the product of the width and height of the current block is not 32 and the value of the MMVD enabled flag is 1 or when the maximum number of subblock merge candidates is greater than 0 and the width and height of the current block are 8 or greater, the encoding apparatus may signal the MMVD merge flag.

To this end, as an example, the merge data syntax may be configured as shown in Table 7 below.

TABLE 7

| | Descriptor |
|---|---|
| merge_data( x0, y0, cbWidth, chHeight ) { | |
|   if ( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag \|\| cbWidth * cbHeight != 32 ) | |
|       regular_merge_flag[ x0 ][ y0 ] | ae(v) |
|     if ( regular_merge_flag[ x0 ][ y0 ] = = 1 ){ | |
|       if( MaxNumMergeCand > 1 ) | |
|         merge_idx[ x0 ][ y0 ] | ae(v) |
|     } else { | |
|       if( (sps_mmvd_enabled_flag && cbWidth * cbHeight != 32 ) \|\| | |
|         (MaxNumSubblockMergeCand > 0 && cbWidth >= 8 && cbHeight >= 8) \|\| | |
|         (sps_ciip_enabled_flag && cu_skip_flag[ x0 ][ y0 ] = = 0 && | |
|         (cbWidth * cbHeight ) >= 64 && cbWidth < 128 && cbHeight < 128) \|\| | |
|         (sps_triangle_enabled_flag && cbWidth * cbHeight>=64 && | |
|         MaxNumTriangleMergeCand>=2 && slice_type = = B_SLICE) ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] = = 0 && | |
|           ( cbWidth * cbHeight ) >= 64 && cbWidth < 128 && cbHeight < 128 ) | |
|         { | |
|           ciip_flag[ x0 ][ y0 ] | ae(v) |
|           if( ciip_flag[ x0 ][ y0 ] && MaxNumMergeCand > 1 ) | |
|             merge_idx[ x0 ][ y0 ] | ae(v) |
|         } | |
|         if( MergeTriangleFlag[ x0 ][ y0 ] ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | | mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_merge_flag[x0][y0] is not present, it is inferred as follows.

If all of the following conditions are true, mmvd_merge_flag[x0][y0] is inferred to be equal to 1.
  general_merge_flag[x0][y0] is equal to 1
  regular_merge_flag[x0][y0] is equal to 0
  sps_mmvd_enable_flag is equal to 1
  cbWidth*cbHeight !=32

MaxNumSubblockMergeCand<=0 or cbWidth<8 or cbHeight<8 sps_ciip_enabled_flag is equal to 0 or cbWidth>=128 or cbHeight>=128 or cu_skip_flag[x0][y0] is equal to 1 sps_triangle_enabled_flag is equal to 0 or MaxNumTriangleMergeCand<2 or slice_type is not equal to B_SLICE Otherwise, mmvd_merge_flag[x0][y0] is inferred to be equal to 0.

Meanwhile, according to another embodiment, as an example, the encoding apparatus may include a merge subblock flag in the image information based on that a condition based on the CIIP enabled flag and a condition based on a size of the current block is satisfied so that the same syntax is not repeatedly transmitted. Here, the condition based on the size of the current block may be a case in which a product of a height of the current block and a width of the current block is 64 or greater and the height of the current block and the width of the current block are each smaller than 128. The condition based on the CIIP enabled flag may be a case in which a value of the CIIP enabled flag is 1. In other words, when the product of the height of the current block and the width of the current block is 64 or greater, the height of the current block and the width of the current block are each smaller than 128, and the value of the CIIP enabled flag is 1, the encoding apparatus may then signal the merge subblock flag.

As another example, the encoding apparatus may include the merge subblock flag in the image information based on that the condition based on the CU skip flag is further satisfied in addition to the condition based on the CIIP enabled flag and the condition based on the size of the current block. Here, the condition based on the CU skip flag may be a case in which the value of the CU skip flag is 0. In other words, when the product of the height of the current block and the width of the current block is 64 or greater, the height of the current block and the width of the current block are less than 128, the value of the CIIP enabled flag is 1, and a value of the CU skip flag is 0, the encoding apparatus may then signal the merge subblock flag.

As another example, the encoding apparatus may include the merge subblock flag in the image information based on that a condition based on the information on the current block and the partitioning mode enabled flag is satisfied. Here, the condition based on the information on the current block may include a case in which the product of the width and the height of the current block is 64 or greater and/or a case in which a slice type including the current block is a B slice. The condition based on the partitioning mode enabled flag may be a case in which the value of the partitioning mode enabled flag is 1. In other words, when both the condition based on the height of the current block and information on the current block and the condition based on the partitioning mode enabled flag are satisfied, the encoding apparatus may signal the merge subblock flag.

When the condition based on the CIIP enabled flag and the condition based on the size of the current block are not satisfied, the encoding apparatus may determine whether the condition based on the information on the current block and the partitioning mode enabled flag is satisfied. Alternatively, when the condition based on the information on the current block and the partitioning mode enabled flag is not satisfied, the encoding apparatus may determine whether the condition based on the CIIP enabled flag and the condition based on the size of the current block are satisfied.

Meanwhile, the encoding apparatus may signal the merge subblock flag when the maximum number of subblock merge candidates is greater than 0 and the width and height of the current block are each 8 or greater.

To this end, as an example, the merge data syntax may be configured as shown in Table 8 below.

TABLE 8

| | Descriptor |
|---|---|
| merge_data( x0, y0, cbWidth, cbHeight ) { | |
|     if ( CuPredMode[ x0 ][ y0 ] = = MODE_IBC ) { | |
|       if( MaxNumMergeCand > 1 ) | |
|         merge_idx[ x0 ][ y0 ] | ae(v) |
|     } else { | |
|       if( sps_mmvd_enabled_flag \|\| cbWidth * cbHeight != 32 ) | |
|         regular_merge_flag[ x0 ][ y0 ] | ae(v) |
|       if ( regular_merge_flag[ x0 ][ y0 ] = = 1 ){ | |
|         if( MaxNumMergeCand > 1 ) | |
|           merge_idx[ x0 ][ y0 ] | ae(v) |
|       } else { | |
|         if( sps_mmvd_enabled_flag && cbWidth * cbHeight != 32 ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( (MaxNumSubblockMergeCand > 0 && cbWidth >= 8 && cbHeight >= 8 ) \|\| | |
|             (sps_ciip_enabled_flag && cu_skip_flag[ x0 ][ y0 ] = = 0 && | |
|               cbWidth * CbHeight >= 64 && cbWidth < 128 && cbHeight < 128) \|\| | |
|             (sps_triangle_enabled_flag && cbWidth * cbHeight>=64 && | |
|               MaxNumTriangleMergeCand>=2 && slice_type = = B SLICE)) | |
|             merge_subblock_flag[ x0 ][ y0 ] | ae(v) |

TABLE 8-continued

| | Descriptor |
|---|---|
| ```
        if( merge_subblock_flag[ x0 ][ y0 ] = = 1 ) {
            if( MaxNumSubblockMergeCand > 1 )
                merge_subblock_idx[ x0 ][ y0 ]
        } else {
            if( sps_ciip_enabled_flag && cu_skip_flag[ x0 ][ y0 ] = = 0 &&
                ( cbWidth * cbHeight ) >= 64 && cbWidth < 128 && cbHeight < 128 )
``` | |
| ```
                ciip_flag[ x0 ][ y0 ]
            if( ciip_flag[ x0 ][ y0 ] && MaxNumMergeCand > 1 )
                merge_idx[ x0 ][ y0 ]
            }
            if( MergeTriangleFlag[ x0 ][ y0 ] ) {
                merge_triangle_split_dir[ x0 ][ y0 ]
                merge_triangle_idx0[ x0 ][ y0 ]
                merge_triangle_idx1[ x0 ][ y0 ]
            }
        }
    }
  }
}
``` | ae(v)<br>ae(v)<br><br>ae(v)<br>ae(v)<br>ae(v) | merge_subblock_flag[x0][y0] specifies whether the sub-block-based inter prediction parameters for the current coding unit are inferred from neighbouring blocks. The array indices x0, y0 specify the location (x0, y0) of the top-left luma sample of the considered coding block relative to the top-left luma sample of the picture.

When merge_subblock_flag[x0][y0] is not present, it is inferred as follow.

If all of the following conditions are true, merge_subblock_flag[x0][y0] is inferred to be equal to 1.
   general_merge_flag[x0][y0] is equal to 1
   regular_merge_flag[x0][y0] is equal to 0
   merge_subblock_flag[x0][y0] is equal to 0
   mmvd_merge_flag[x0][y0] is equal to 0
   MaxNumSubblockMergeCand>0
   cbWidth>=8 and cbHeight>=8
   sps_ciip_enabled_flag is equal to 0 or cbWidth>=128 or cbHeight>=128 or cu_skip_flag[x0][y0] is equal to 1
   sps_triangle_enabled_flag is equal to 0 or MaxNumTriangleMergeCand<2 or slice_type is not equal to B_SLICE Otherwise, merge_subblock_flag[x0][y0] is inferred to be equal to 0.

Meanwhile, according to another embodiment, as an example, the encoding apparatus may include the CIIP flag in the image information based on that the condition based on the CIIP enabled flag and the condition based on the size of the current block is satisfied so that the same syntax is not repeatedly transmitted. Here, the condition based on the size of the current block may be a case in which the product of the height of the current block and the width of the current block is 64 or greater and the height of the current block and the width of the current block are each smaller than 128. The condition based on the CIIP enabled flag may be a case in which the value of the CIIP enabled flag is 1. In other words, when the product of the height of the current block and the width of the current block is 64 or greater, the height of the current block and the width of the current block are smaller than 128, and the value of the CIIP enabled flag is 1, the encoding apparatus may signal the CIIP flag.

As another example, the encoding apparatus may include the CIIP flag in the image information based on that the condition based on the CU skip flag is further satisfied in addition to the condition based on the CIIP enabled flag and the condition based on the size of the current block. Here, the condition based on the CU skip flag may be a case in which the value of the CU skip flag is 0. In other words, when the product of the height of the current block and the width of the current block is 64 or greater, the height of the current block and the width of the current block are each smaller than 128, the value of the CIIP enabled flag is 1, and the value of the CU skip flag is 0, the encoding apparatus may then signal the CIIP flag.

As another example, the encoding apparatus may include the CIIP flag in the image information based on that the condition based on the information on the current block and the partitioning mode enabled flag are satisfied. Here, the condition based on the information on the current block may include the case in which the product of the width and the height of the current block is 64 or greater and/or a case in which a slice type including the current block is a B slice. The condition based on the partitioning mode enabled flag may be a case in which the value of the partitioning mode enabled flag is 1. In other words, the encoding apparatus may signal the CIIP flag when both the condition based on the height of the current block and information on the current block and the condition based on the partitioning mode enabled flag are satisfied.

When the condition based on the CIIP enabled flag and the condition based on the size of the current block are not satisfied, the encoding apparatus may determine whether the condition based on the information on the current block and the partitioning mode enabled flag are satisfied. Alternatively, when the condition based on the information on the current block and the partitioning mode enabled flag are not satisfied, the encoding apparatus may determine whether the condition based on the CIIP enabled flag and the condition based on the size of the current block are satisfied.

To this end, as an example, the merge data syntax may be configured as shown in Table 9 below.

TABLE 9

| | Descriptor |
|---|---|
| merge_data( x0, y0, cbWidth, cbHeight ) { | |
|     if ( CuPrecMode[ x0 ][ y0 ] = = MODE_IBC ) { | |
|         if( MaxNumMergeCand > 1 ) | |
|             merge_idx[ x0 ][ y0 ] | ae(v) |
|     } else { | |
|         if( sps_mmvd_enabled_flag \|\| cbWidth * cbHeight != 32 ) | |
|             regular_merge_flag[ x0 ][ y0 ] | ae(v) |
|         if ( regular_merge_flag[ x0 ][ y0 ] = = 1 ){ | |
|             if( MaxNumMergeCand > 1 ) | |
|                 merge_idx[ x0 ][ y0 ] | ae(v) |
|         } else { | |
|             if( sps_mmvd_enabled_flag && cbWidth * cbHeight != 32 ) | |
|                 mmvd_merge_flag[ x0 ][ y0 ] | ae(v) |
|             if( mmvd_merge_flag[ x0 ][ y0 ] = = 1 ) { | |
|                 if( MaxNumMergeCand > 1 ) | |
|                     mmvd_cand_flag[ x0 ][ y0 ] | ae(v) |
|                 mmvd_distance_idx[ x0 ][ y0 ] | ae(v) |
|                 mmvd_direction_idx[ x0 ][ y0 ] | ae(v) |
|             } else { | |
|                 if( MaxNumSubblockMergeCand > 0 && cbWidth >= 8 && cbHeight >= 8 ) | |
|                     merge_subblock_flag[ x0 ][ y0 ] | ae(v) |
|                 if( merge_subblock_flag[ x0 ][ y0 ] = = 1 ) { | |
|                     if( MaxNumSubblockMergeCand > 1 ) | |
|                         merge_subblock_idx[ x0 ][ y0 ] | ae(v) |
|                 } else { | |
|                   if(( sps_ciip_enabled_flag && cu_stop_flag[ x0 ][ y0 ] = = 0 && | |
|                     ( cbWidth * cbHeight ) >= 64 && cbWidth < 128 && cbHeight < 128 ) | |
|                   \|\| (sps_triangle_enabled_flag && cbWidth * cbHeight>=64 && | |
|                     MaxNumTriangleMergeCand>=2 && slice_type = = B_SLICE){ | |
|                     ciip_flag[ x0 ][ y0 ] | ae(v) |
|                   if( ciip_flag[ x0 ][ y0 ] && MaxNumMergeCand > 1 ) | |
|                     merge_idx[ x0 ][ y0 ] | ae(v) |
|                 } | |
|                 if( MergeTriangleFlag[ x0 ][ y0 ] ) { | |
|                     merge_triangle_split_dir[ x0 ][ y0 ] | ae(v) |
|                     merge_triangle_idx0[ x0 ][ y0 ] | ae(v) |
|                     merge_triangle_idx1[ x0 ][ y0 ] | ae(v) |
|                 } | |
|               } | |
|             } | |
|         } | |
|     } | |
| } | | ciip_flag[x0][y0] specifies whether the combined inter-picture merge and intra-picture prediction is applied for the current coding unit. Ciip_flag[x0][y0] specifies whether the combined inter-picture merge and intra-picture prediction is applied for the current coding unit.

When ciip_flag[x0][y0] is not present, it is inferred as follows.

If all of the following conditions are true, ciip_flag[x0][y0] is inferred to be equal to 1.
    general_merge_flag[x0][y0] is equal to 1
    regular_merge_flag[x0][y0] is equal to 0
    merge_subblock_flag[x0][y0] is equal to 0
    mmvd_merge_flag[x0][y0] is equal to 0
    sps_ciip_enabled_flag is equal to 1
    cu_skip_flag[x0][y0] is equal to 0
    cbWidth*cbHeight>=64 and cbWidth<128 and cbHeight<128
    sps_triangle_enabled_flag is equal to 0 or MaxNumTriangleMergeCand<2 or slice_type is not equal to B_SLICE Otherwise, ciip_flag[x0][y0] is inferred to be equal to 0.

Figure 15:
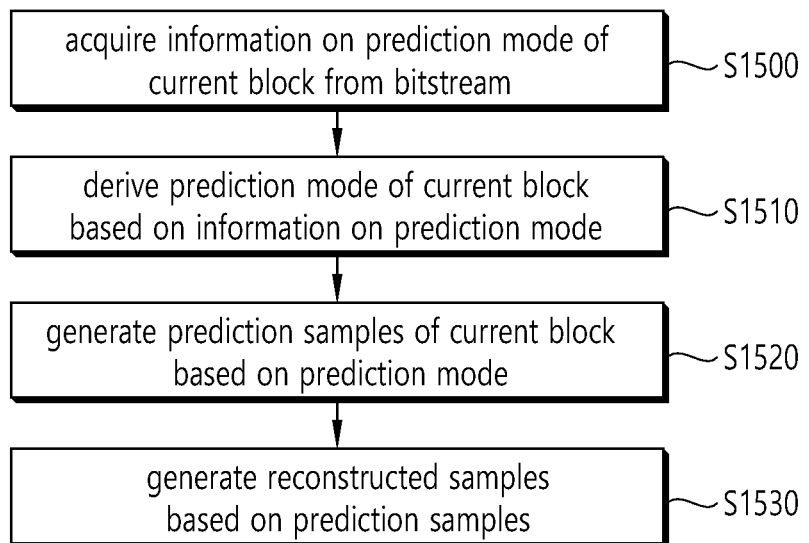
FIGS. 15 and 16 schematically show an example of a video/image decoding method including an inter prediction method and related components according to an embodiment of the present disclosure.
Figure 16:
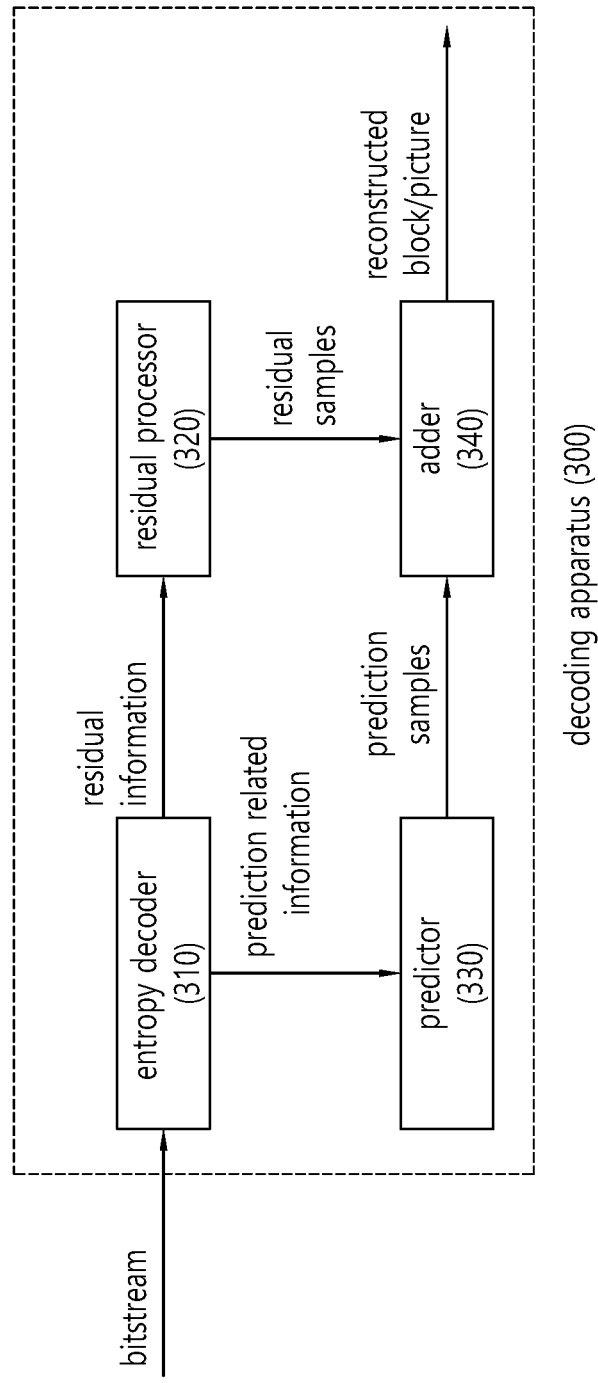

FIGS. 15 and 16 schematically show an example of a video/image decoding method including an inter prediction method and related components according to an embodiment of the present disclosure.

The decoding method disclosed in FIG. 15 may be performed by the decoding apparatus 300 illustrated in FIGS. 3 and 16. Specifically, for example, steps S1500 to S1520 of FIG. 15 may be performed by the predictor 330 of the decoding apparatus 300, and step S1530 may be performed by the adder 340 of the decoding apparatus 300. The decoding method disclosed in FIG. 15 may include the embodiments described above in this document.

Referring to FIGS. 15 and 16, the decoding apparatus may acquire information on a prediction mode of a current block from a bitstream (S1500). Specifically, the entropy decoder 310 of the decoding apparatus may derive residual information and information on the prediction mode from a signal received in the form of a bitstream from the encoding apparatus of FIG. 2. Here, the information on the prediction mode may be referred to as prediction related information. The information on the prediction mode may include inter/intra prediction classification information, inter prediction mode information, and the like, and may include various syntax elements related thereto.

The bitstream may include image information including information on various parameter sets, such as an adaptation parameter set (APS), a picture parameter set (PPS), a sequence parameter set (SPS), or a video parameter set (VPS). The image information may further include information on the prediction mode of the current block, such as a coding unit syntax and merge data syntax. The sequence parameter set may include a CIIP enabled flag, an enabled flag for a partitioning mode, and the like. The coding unit syntax may include a CU skip flag indicating whether the skip mode is applied to the current block.

Meanwhile, the residual processor 320 of the decoding apparatus may generate residual samples based on the residual information. Also, the predictor 330 of the decoding apparatus may derive a prediction mode of the current block based on the information on the prediction mode (S1510). In addition, motion information of the current block may be derived based on the derived prediction mode. In this case, the predictor of the decoding apparatus may construct a motion information candidate list based on neighboring blocks of the current block, and derive a motion vector and/or a reference picture index of the current block based on the candidate selection information received from the encoding apparatus. When the motion information of the current block is derived, the predictor of the decoding apparatus may generate prediction samples of the current block based on the motion information of the current block (S1520). Thereafter, the adder 340 of the decoding apparatus may generate reconstructed samples based on the prediction samples generated by the predictor 330 and the residual samples generated by the residual processor 320 (S1530). A reconstructed picture may be generated based on the reconstructed samples. Thereafter, an in-loop filtering procedure such as deblocking filtering, SAO and/or ALF procedures may be applied to the reconstructed picture in order to improve subjective/objective image quality as needed.

As an embodiment, in deriving the prediction mode of the current block, the decoding apparatus may acquire a regular merge flag from the bitstream based on that a condition based on the CIIP enabled flag and a condition based on the size of the current block are satisfied. Here, the condition based on the size of the current block may be a case in which a product of a height of the current block and a width of the current block is 64 or greater and the height of the current block and the width of the current block are each smaller than 128. The condition based on the CIIP enabled flag may be a case in which a value of the CIIP enabled flag is 1. In other words, when the product of the height of the current block and the width of the current block is 64 or greater, the height of the current block and the width of the current block are each smaller than 128, and the value of the CIIP enabled flag is 1, the decoding apparatus may then parse the regular merge flag from the merge data syntax included in the bitstream.

As another example, the regular merge flag may be acquired from the bitstream based on that a condition based on the CU skip flag and the size of the current block are satisfied. Here, the condition based on the size of the current block may be a case in which the product of the height of the current block and the width of the current block is 64 or greater and the height of the current block and the width of the current block are each smaller than 128. The condition based on the CU skip flag may be a case in which the value of the CU skip flag is 0. In other words, when the product of the height of the current block and the width of the current block is 64 or greater, the height of the current block and the width of the current block are each smaller than 128, and the value of the CU skip flag is 0, the decoding apparatus may then parse the regular merge flag from the merge data syntax included in the bitstream.

As another example, the decoding apparatus may acquire the regular merge flag from the bitstream based on that the condition based on the CU skip flag is further satisfied in addition to the condition based on the CIIP enabled flag and the condition based on the size of the current block. Here, the condition based on the CU skip flag may be a case in which the value of the CU skip flag is 0. In other words, when the product of the height of the current block and the width of the current block is 64 or greater, the height of the current block and the width of the current block are less than 128, the value of the CIIP enabled flag is 1, and a value of the CU skip flag is 0, the decoding apparatus may then parse the regular merge flag from the merge data syntax.

As another example, the decoding apparatus may acquire a regular merge flag from the bitstream based on that a condition based on the information on the current block and the partitioning mode enabled flag is satisfied. Here, the condition based on the information on the current block may include a case in which the product of the width and the height of the current block is 64 or greater and/or a case in which a slice type including the current block is a B slice. The condition based on the partitioning mode enabled flag may be a case in which the value of the partitioning mode enabled flag is 1. In other words, when both the condition based on the height of the current block and information on the current block and the condition based on the partitioning mode enabled flag are satisfied, the decoding apparatus may parse the regular merge flag from the merge data syntax.

When the condition based on the CIIP enabled flag and the condition based on the size of the current block are not satisfied, the decoding apparatus may determine whether the condition based on the information on the current block and the partitioning mode enabled flag is satisfied. Alternatively, when the condition based on the information on the current block and the partitioning mode enabled flag is not satisfied, the decoding apparatus may determine whether the condition based on the CIIP enabled flag and the condition based on the size of the current block are satisfied.

Meanwhile, when the product of the width and height of the current block is not 32 and the value of the MMVD enabled flag is 1 or when the maximum number of subblock merge candidates is greater than 0 and the width and height of the current block are 8 or greater, the decoding apparatus may parse the regular merge flag from the bitstream. To this end, the merge data syntax may be configured as shown in Table 6 above.

When the regular merge flag does not exist in the bitstream, the decoding apparatus may derive a value of the regular merge flag as 1, if a value of a general merge flag is 1, a value of the MMVD enabled flag of the SPS is 0, the product of the width and the height of the current block is 32, the maximum number of the subblock merge candidates is 0 or less, the width of the current block is less than 8, the height of the current block is less than 8, the value of the CIIP enable flag of the SPS is 0, the product of the width and height of the current block is less than 64, the width of the current block is 128 or greater, the value of the CU skip flag is 1, the value of the partitioning enabled flag of the SPS is 0, the maximum number of partitioning merge candidates is less than 2, or a slice type is not B slice. Otherwise, the value of the regular merge flag may be derived as 0.

As another embodiment, in deriving the prediction mode of the current block, the decoding apparatus may acquire the MMVD merge flag from the bitstream based on that the condition based on the CIIP enabled flag and the condition based on the size of the current block are satisfied. Here, the condition based on the size of the current block may be a case in which a product of a height of the current block and a width of the current block is 64 or greater and the height of the current block and the width of the current block are each smaller than 128. The condition based on the CIIP enabled flag may be a case in which a value of the CIIP enabled flag is 1. In other words, when the product of the height of the current block and the width of the current block is 64 or greater, the height of the current block and the width of the current block are each smaller than 128, and the value of the CIIP enabled flag is 1, the decoding apparatus may then parse the MMVD merge flag from the merge data syntax included in the bitstream.

As another example, the decoding apparatus may acquire the MMVD merge flag from the bitstream based on that the condition based on the CU skip flag and the size of the current block is satisfied. Here, the condition based on the size of the current block may be a case in which the product of the height of the current block and the width of the current block is 64 or greater and the height of the current block and the width of the current block are each smaller than 128. The condition based on the CU skip flag may be a case in which the value of the CU skip flag is 0. In other words, when the product of the height of the current block and the width of the current block is 64 or greater, the height of the current block and the width of the current block are each smaller than 128, and the value of the CU skip flag is 0, the decoding apparatus may then parse the MMVD merge flag from the merge data syntax included in the bitstream.

As another example, the decoding apparatus may acquire the MMVD merge flag from the bitstream based on that the condition based on the CU skip flag is further satisfied in addition to the condition based on the CIIP enabled flag and the condition based on the size of the current block. Here, the condition based on the CU skip flag may be a case in which the value of the CU skip flag is 0. In other words, when the product of the height of the current block and the width of the current block is 64 or greater, the height of the current block and the width of the current block are less than 128, the value of the CIIP enabled flag is 1, and a value of the CU skip flag is 0, the decoding apparatus may then parse the MMVD merge flag from the merge data syntax.

As another example, the decoding apparatus may acquire the MMVD merge flag from the bitstream based on that a condition based on the information on the current block and the partitioning mode enabled flag is satisfied. Here, the condition based on the information on the current block may include a case in which the product of the width and the height of the current block is 64 or greater and/or a case in which a slice type including the current block is a B slice. The condition based on the partitioning mode enabled flag may be a case in which the value of the partitioning mode enabled flag is 1. In other words, when both the condition based on the height of the current block and information on the current block and the condition based on the partitioning mode enabled flag are satisfied, the decoding apparatus may parse the MMVD merge flag from the merge data syntax.

When the condition based on the CIIP enabled flag and the condition based on the size of the current block are not satisfied, the decoding apparatus may determine whether the condition based on the information on the current block and the partitioning mode enabled flag is satisfied. Alternatively, when the condition based on the information on the current block and the partitioning mode enabled flag is not satisfied, the decoding apparatus may determine whether the condition based on the CIIP enabled flag and the condition based on the size of the current block are satisfied.

Meanwhile, when the product of the width and height of the current block is not 32 and the value of the MMVD enabled flag is 1 or when the maximum number of subblock merge candidates is greater than 0 and the width and height of the current block are 8 or greater, the decoding apparatus may parse the MMVD merge flag from the bitstream. To this end, the merge data syntax may be configured as shown in Table 7 above.

When the MMVD merge flag does not exist in the bitstream, the decoding apparatus may derive a value of the MMVD merge flag as 1, if a value of THE general merge flag is 1, a value of the general merge flag is 0, a value of the MMVD enabled flag of the SPS is 1, the product of the width and the height of the current block is not 32, the maximum number of the subblock merge candidates is 0 or less, the width of the current block is less than 8, the height of the current block is less than 8, the value of the CIIP enable flag of the SPS is 0, the width of the current block is 128 or greater, the height of the current block is 128 or greater, the value of the CU skip flag is 1, the value of the partitioning enabled flag of the SPS is 0, the maximum number of partitioning merge candidates is less than 2, or a slice type is not B slice. Otherwise, the value of the MMVD merge flag may be derived as 0.

As another embodiment, in deriving the prediction mode of the current block, the decoding apparatus may acquire a merge subblock flag from the bitstream based on that a condition based on the CIIP enabled flag and a condition based on the size of the current block are satisfied. Here, the condition based on the size of the current block may be a case in which a product of a height of the current block and a width of the current block is 64 or greater and the height of the current block and the width of the current block are each smaller than 128. The condition based on the CIIP enabled flag may be a case in which a value of the CIIP enabled flag is 1. In other words, when the product of the height of the current block and the width of the current block is 64 or greater, the height of the current block and the width of the current block are each smaller than 128, and the value of the CIIP enabled flag is 1, the decoding apparatus may then parse the merge subblock flag from the merge data syntax included in the bitstream.

As another example, the merge subblock flag may be acquired from the bitstream based on that a condition based on the CU skip flag and the size of the current block are satisfied. Here, the condition based on the size of the current block may be a case in which the product of the height of the current block and the width of the current block is 64 or greater and the height of the current block and the width of the current block are each smaller than 128. The condition based on the CU skip flag may be a case in which the value of the CU skip flag is 0. In other words, when the product of the height of the current block and the width of the current block is 64 or greater, the height of the current block and the width of the current block are each smaller than 128, and the value of the CU skip flag is 0, the decoding apparatus may then parse the merge subblock flag from the merge data syntax included in the bitstream.

As another example, the decoding apparatus may acquire the merge subblock flag from the bitstream based on that the condition based on the CU skip flag is further satisfied in addition to the condition based on the CIIP enabled flag and the condition based on the size of the current block. Here, the condition based on the CU skip flag may be a case in which the value of the CU skip flag is 0. In other words, when the product of the height of the current block and the width of the current block is 64 or greater, the height of the current block and the width of the current block are less than 128, the value of the CIIP enabled flag is 1, and a value of the CU skip flag is 0, the decoding apparatus may then parse the merge subblock flag from the merge data syntax.

As another example, the decoding apparatus may acquire a merge subblock flag from the bitstream based on that a condition based on the information on the current block and the partitioning mode enabled flag is satisfied. Here, the condition based on the information on the current block may include a case in which the product of the width and the height of the current block is 64 or greater and/or a case in which a slice type including the current block is a B slice. The condition based on the partitioning mode enabled flag may be a case in which the value of the partitioning mode enabled flag is 1. In other words, when both the condition based on the height of the current block and information on the current block and the condition based on the partitioning mode enabled flag are satisfied, the decoding apparatus may parse the merge subblock flag from the merge data syntax.

When the condition based on the CIIP enabled flag and the condition based on the size of the current block are not satisfied, the decoding apparatus may determine whether the condition based on the information on the current block and the partitioning mode enabled flag is satisfied. Alternatively, when the condition based on the information on the current block and the partitioning mode enabled flag is not satisfied, the decoding apparatus may determine whether the condition based on the CIIP enabled flag and the condition based on the size of the current block are satisfied.

Meanwhile, when the maximum number of subblock merge candidates is greater than 0 and the width and height of the current block are 8 or greater, the decoding apparatus may parse the merge subblock flag from the bitstream. To this end, the merge data syntax may be configured as shown in Table 8 above.

When the merge subblock flag does not exist in the bitstream, the decoding apparatus may drive a value of the merge subblock flag as 1, if a value of a general merge flag is 1, a value of the regular merge flag is 0, a value of the merge subblock flag is 0, a value of the MMVD merge flag is 0, the maximum number of the subblock merge candidates is greater than 0, the width and height of the current block is 8 or greater, a value of the CIIP enable flag of the SPS is 0, the width of the current block is 128 or greater, the height of the current block is 128 or greater, the value of the CU skip flag is 1, the value of the partitioning enabled flag of the SPS is 0, the maximum number of partitioning merge candidates is less than 2, or a slice type is not B slice. Otherwise, the value of the merge subblock flag may be derived as 1.

As another embodiment, in deriving the prediction mode of the current block, the decoding apparatus may acquire the MMVD merge flag from the bitstream based on that the condition based on the CIIP enabled flag and the condition based on the size of the current block are satisfied. Here, the condition based on the size of the current block may be a case in which a product of a height of the current block and a width of the current block is 64 or greater and the height of the current block and the width of the current block are each smaller than 128. The condition based on the CIIP enabled flag may be a case in which a value of the CIIP enabled flag is 1. In other words, when the product of the height of the current block and the width of the current block is 64 or greater, the height of the current block and the width of the current block are each smaller than 128, and the value of the CIIP enabled flag is 1, the decoding apparatus may then parse the CIIP flag from the merge data syntax.

As another example, the decoding apparatus may acquire the CIIP flag from the bitstream based on that the condition based on the CU skip flag is further satisfied in addition to the condition based on the CIIP enabled flag and the condition based on the size of the current block. Here, the condition based on the CU skip flag may be a case in which the value of the CU skip flag is 0. In other words, when the product of the height of the current block and the width of the current block is 64 or greater, the height of the current block and the width of the current block are less than 128, the value of the CIIP enabled flag is 1, and a value of the CU skip flag is 0, the decoding apparatus may then parse the CIIP flag from the merge data syntax.

As another example, the decoding apparatus may acquire the CIIP flag from the bitstream based on that a condition based on the information on the current block and the partitioning mode enabled flag is satisfied. Here, the condition based on the information on the current block may include a case in which the product of the width and the height of the current block is 64 or greater and/or a case in which a slice type including the current block is a B slice. The condition based on the partitioning mode enabled flag may be a case in which the value of the partitioning mode enabled flag is 1. In other words, when both the condition based on the height of the current block and information on the current block and the condition based on the partitioning mode enabled flag are satisfied, the decoding apparatus may parse the CIIP flag from the merge data syntax.

When the condition based on the CIIP enabled flag and the condition based on the size of the current block are not satisfied, the decoding apparatus may determine whether the condition based on the information on the current block and the partitioning mode enabled flag is satisfied. Alternatively, when the condition based on the information on the current block and the partitioning mode enabled flag is not satisfied, the decoding apparatus may determine whether the condition based on the CIIP enabled flag and the condition based on the size of the current block are satisfied. To this end, the merge data syntax may be configured as shown in Table 9 above.

When the CIIP flag is not present in the bitstream, the decoding apparatus may derive the value of the CIIP flag as 1, if the value of the general merge flag is 1, the value of the regular merge flag is 0, the value of the merge subblock flag is 0, the value of the MMVD merge flag is 0, the value of the CIIP enable flag of the SPS is 1, the value of the CU skip flag is 0, the product of the width and height of the current block is 64 or greater, and the width and height of the current block are smaller than 128, the value of the partitioning enable flag of the SPS is 0, the maximum number of partitioning merge candidates is less than 2, or the slice type is not B slice. Otherwise, the value of the CIIP flag may be derived as 0.

Although methods have been described on the basis of a flowchart in which steps or blocks are listed in sequence in the above-described embodiments, the steps of the present disclosure are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present disclosure is applied may be produced in the form of a program executed by a computer and may be stored in a computer-readable recording medium. Multimedia data having a data structure according to the embodiment(s) of the present disclosure may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present disclosure may be embodied as a computer program product based on a program code, and the program code may be executed on a computer according to the embodiment(s) of the present disclosure. The program code may be stored on a computer-readable carrier.

Figure 17:
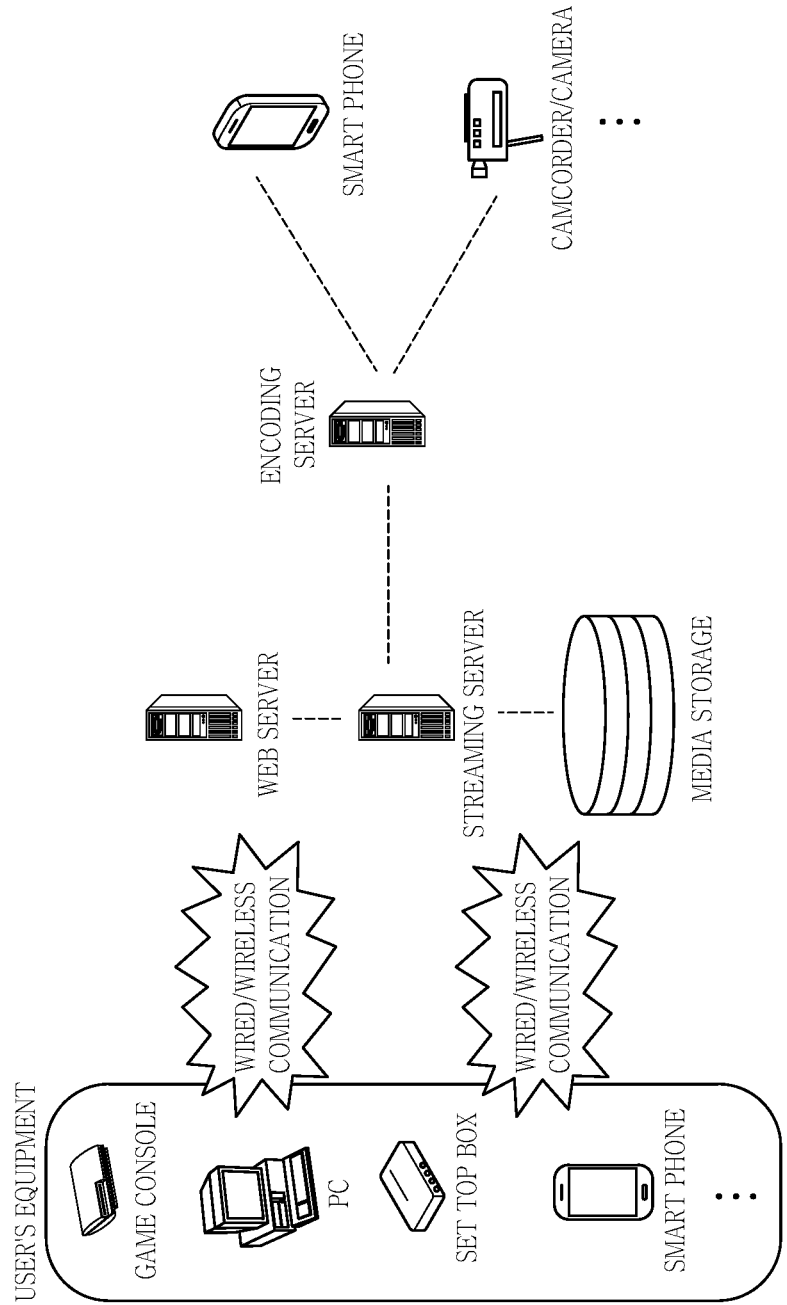
FIG. 17 shows an example of a content streaming system to which embodiments disclosed in this document may be applied.

FIG. 17 represents an example of a contents streaming system to which the embodiment of the present disclosure may be applied.

Referring to FIG. 17, the content streaming system to which the embodiments of the present disclosure is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case in which the multimedia input device, such as, the smart phone, the camera, the camcorder or the like, directly generates a bitstream, the encoding server may be omitted.

The bitstream may be generated by an encoding method or a bitstream generation method to which the embodiments of the present disclosure is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. A decoding method performed by a decoding apparatus, the decoding method comprising:
    acquiring information on a prediction mode of a current block from a bitstream;
    deriving the prediction mode of the current block based on the information on the prediction mode;
    generating prediction samples of the current block based on the prediction mode; and
    generating reconstructed samples based on the prediction samples,
    wherein the bitstream includes a sequence parameter set,
    the sequence parameter set includes a combined inter-picture merge and intra-picture prediction (CIIP) enabled flag, and the deriving includes parsing a regular merge flag from the bitstream based on that a condition based on the CIIP enabled flag and a condition based on a size of the current block are satisfied.

2. The decoding method of claim 1, wherein
the condition based on the size of the current block is that a product of a height of the current block and a width of the current block is 64 or greater.

3. The decoding method of claim 1, wherein
each the condition based on the size of the current block is that a height of the current block and a width of the current block are smaller than 128.

4. The decoding method of claim 1, wherein
the condition based on the CIIP enable flag is that a value of the CIIP enabled flag is 1.

5. The decoding method of claim 1, wherein
the information on the prediction mode includes a coding unit skip flag indicating whether a skip mode is applied to the current block, and
the parsing includes parsing the regular merge flag from the bitstream based on that the condition based on the CU skip flag is further satisfied.

6. The decoding method of claim 5 wherein
the condition based on the CU skip flag is that a value of the CU skip flag is 0.

7. The decoding method of claim 1, wherein
the sequence parameter set includes a partitioning mode enabled flag performing prediction by dividing the current block into two partitions,
wherein the deriving includes parsing the regular merge flag from the bitstream based on that the condition based on the CIIP enabled flag and the condition based on the size of the current block are not satisfied and a condition based on information on the current block and a condition based on the partitioning mode enabled flag are satisfied.

8. The decoding method of claim 7, wherein
the condition based on the information on the current block is that a type of a slice including the current block is a B slice.

9. The decoding method of claim 7, wherein
the condition based on the partitioning mode enabled flag is that a value of the partitioning mode enabled flag is 1.

10. An encoding method performed by an encoding apparatus, the encoding method comprising:
determining a prediction mode of a current block;
generating information on the prediction mode based on the prediction mode; and
encoding image information including the information on the prediction mode,
wherein the image information includes a sequence parameter set,
the sequence parameter includes a combined inter-picture merge and intra-picture prediction (CIIP) enabled flag, and
the image information includes a regular merge flag based on that a condition based on the CIIP enabled flag and a condition based on a size of the current block are satisfied.

11. The encoding method of claim 10, wherein
the condition based on the size of the current block is that a product of a height of the current block and a width of the current block is 64 or greater, and each the condition based on the size of the current block is that a height of the current block and a width of the current block are smaller than 128.

12. The encoding method of claim 10, wherein
the condition based on the CIIP enable flag is that a value of the CIIP enabled flag is 1.

13. The encoding method of claim 10, wherein
the image information includes a coding unit (CU) skip flag indicating whether a skip mode is applied to the current block, and
the image information includes the regular merge flag based on that a condition based on the CU skip flag is further satisfied.

14. The encoding method of claim 13, wherein
the condition based on the CU skip flag is that a value of the CU skip flag is 0.

15. A non-transitory computer-readable digital storage medium storing a bitstream generated by an image encoding method, the method comprising:
determining a prediction mode of a current block;
generating information on the prediction mode based on the prediction mode; and
encoding image information to generate the bitstream, wherein the image information includes the information on the prediction mode,
wherein the image information includes a sequence parameter set,
the sequence parameter includes a combined inter-picture merge and intra-picture prediction (CIIP) enabled flag, and
the image information includes a regular merge flag based on that a condition based on the CIIP enabled flag and a condition based on a size of the current block are satisfied.

* * * * *